US011153636B2

(12) United States Patent
Watanabe et al.

(10) Patent No.: US 11,153,636 B2
(45) Date of Patent: Oct. 19, 2021

(54) VIDEO DISTRIBUTION SYSTEM, VIDEO DISTRIBUTION METHOD, AND STORAGE MEDIUM STORING VIDEO DISTRIBUTION PROGRAM FOR DISTRIBUTING VIDEO CONTAINING ANIMATION OF CHARACTER OBJECT GENERATED BASED ON MOTION OF ACTOR

(71) Applicant: Gree, Inc., Tokyo (JP)

(72) Inventors: Masashi Watanabe, Tokyo (JP); Yasunori Kurita, Tokyo (JP)

(73) Assignee: Gree, Inc., Tokyo (JP)

( * ) Notice: Subject to any disclaimer, the term of this patent is extended or adjusted under 35 U.S.C. 154(b) by 0 days.

(21) Appl. No.: 16/406,195

(22) Filed: May 8, 2019

(65) Prior Publication Data
US 2019/0349625 A1 Nov. 14, 2019

(30) Foreign Application Priority Data

May 8, 2018 (JP) .............................. JP2018-089612
Aug. 1, 2018 (JP) .............................. JP2018-144681
(Continued)

(51) Int. Cl.
*H04N 21/478* (2011.01)
*H04N 21/431* (2011.01)
(Continued)

(52) U.S. Cl.
CPC ......... *H04N 21/4316* (2013.01); *G06T 13/40* (2013.01); *G06T 13/80* (2013.01);
(Continued)

(58) Field of Classification Search
CPC ................. G06T 7/20; H04N 21/4788; H04N 21/8146–8166
See application file for complete search history.

(56) References Cited

U.S. PATENT DOCUMENTS 5,923,337 A 7/1999 Yamamoto
8,286,218 B2 * 10/2012 Pizzurro ........ H04N 21/234318
725/135
(Continued)

FOREIGN PATENT DOCUMENTS

CN 102595340 A 7/2012
CN 10379812 A 5/2014
(Continued)

OTHER PUBLICATIONS

International Search Report PCT/JP2019/016555 dated May 28, 2019 with English translation.
(Continued)

*Primary Examiner* — Brian T Pendleton
*Assistant Examiner* — Frank Johnson
(74) *Attorney, Agent, or Firm* — Pillsbury Winthrop Shaw Pittman, LLP

(57) ABSTRACT

A video distribution system according to one aspect is a video distribution system for distributing a video containing animation of a character object generated based on a motion of an actor, the video distribution system including: one or more computer processors; and a storage for storing a candidate list including candidates of decorative objects to be displayed in the video in association with the character object. The one or more computer processors execute computer-readable instructions to: in response to reception of a first display request from a viewing user, the first display request being sent for requesting display of a first decorative object among the decorative objects, add the first decorative object to the candidate list, and display the first decorative object in the video upon selection of the first decorative object from the candidate list.

13 Claims, 11 Drawing Sheets

(30) Foreign Application Priority Data

| Aug. 1, 2018 | (JP) | JP2018-144682 |
|---|---|---|
| Aug. 1, 2018 | (JP) | JP2018-144683 |
| Oct. 12, 2018 | (JP) | JP2018-193258 |
| Jan. 23, 2019 | (JP) | JP2019-009432 |

(51) Int. Cl.
*G06T 13/40* (2011.01)
*G06T 13/80* (2011.01)
*H04N 21/4722* (2011.01)
*H04N 21/81* (2011.01)
*H04N 21/4788* (2011.01)

(52) U.S. Cl.
CPC ....... *H04N 21/4722* (2013.01); *H04N 21/816* (2013.01); *H04N 21/4788* (2013.01)

(56) References Cited

U.S. PATENT DOCUMENTS

| | | | |
|---|---|---|---|
| 10,498,794 B1 | 12/2019 | Keighran | |
| 2007/0197296 A1* | 8/2007 | Lee | A63F 13/12 463/42 |
| 2008/0052242 A1* | 2/2008 | Merritt | G06F 21/10 705/59 |
| 2008/0222262 A1* | 9/2008 | Oh | G06F 16/9535 709/206 |
| 2009/0019053 A1* | 1/2009 | Burgess | G06Q 30/02 |
| 2009/0319601 A1 | 12/2009 | Zvonaric et al. | |
| 2010/0100904 A1 | 4/2010 | Kawakami | |
| 2011/0025689 A1* | 2/2011 | Perez | A63F 13/213 345/420 |
| 2011/0246329 A1* | 10/2011 | Geisner | G06F 3/017 705/27.1 |
| 2011/0288912 A1 | 11/2011 | Mccrea | |
| 2013/0038601 A1* | 2/2013 | Han | G06T 13/40 345/419 |
| 2013/0120365 A1 | 5/2013 | Lee et al. | |
| 2013/0145269 A1 | 6/2013 | Latulipe | |
| 2013/0215116 A1* | 8/2013 | Siddique | G06Q 30/0643 345/420 |
| 2014/0013200 A1 | 1/2014 | White | |
| 2014/0215512 A1 | 7/2014 | Maruyama et al. | |
| 2014/0344856 A1* | 11/2014 | Zarom | H04H 60/06 725/37 |
| 2015/0082203 A1* | 3/2015 | James | G06F 3/0484 715/756 |
| 2016/0093078 A1 | 3/2016 | Davis et al. | |
| 2016/0261902 A1 | 9/2016 | Yerli | |
| 2016/0267699 A1 | 9/2016 | Borke | |
| 2016/0277802 A1 | 9/2016 | Bernstein | |
| 2017/0192496 A1 | 7/2017 | Balslev et al. | |
| 2017/0223422 A1 | 8/2017 | Maruyama | |
| 2017/0364860 A1* | 12/2017 | Wilkinson | G06Q 30/0255 |
| 2017/0368454 A1 | 12/2017 | Sivak | |
| 2018/0012407 A1* | 1/2018 | Chuang | G06T 7/75 |
| 2018/0070026 A1 | 3/2018 | Nussbaum et al. | |
| 2018/0082430 A1 | 3/2018 | Sharma et al. | |
| 2018/0342106 A1* | 11/2018 | Rosado | G06T 19/20 |
| 2019/0102929 A1 | 4/2019 | Davis | |
| 2019/0266807 A1* | 8/2019 | Lee | G06T 13/40 |
| 2020/0014982 A1 | 1/2020 | Iwaki | |
| 2020/0204871 A1 | 6/2020 | Bai | |

FOREIGN PATENT DOCUMENTS

| CN | 106550278 | | 3/2017 |
|---|---|---|---|
| EP | 1912175 | A1 | 4/2008 |
| JP | 2001-087548 | A | 4/2001 |
| JP | 2001-137541 | A | 5/2001 |
| JP | 2002-344755 | A | 11/2002 |
| JP | 2002-344775 | A | 11/2002 |
| JP | 2003-091345 | A | 3/2003 |
| JP | 2003-255964 | A | 9/2003 |
| JP | 2004-150972 | A | 5/2004 |
| JP | 2009-059111 | A | 3/2009 |
| JP | 2010-033298 | A | 2/2010 |
| JP | 2010-187858 | A | 9/2010 |
| JP | 2012-093734 | A | 5/2012 |
| JP | 2012-120098 | A | 6/2012 |
| JP | 2014-512199 | A | 5/2014 |
| JP | 2014-217627 | A | 11/2014 |
| JP | 2014-219443 | A | 11/2014 |
| JP | 2015-090526 | A | 5/2015 |
| JP | 2015-146218 | A | 8/2015 |
| JP | 2015-184689 | A | 10/2015 |
| JP | 2015-191205 | A | 11/2015 |
| JP | 2015-223514 | A | 12/2015 |
| JP | 2016-143332 | A | 8/2016 |
| JP | 2016-174941 | A | 10/2016 |
| JP | 2016-189804 | A | 11/2016 |
| JP | 2016-202550 | A | 12/2016 |
| JP | 2017-022555 | A | 1/2017 |
| JP | 2017-121036 | A | 7/2017 |
| JP | 2018-005005 | A | 1/2018 |
| JP | 2018-005320 | A | 1/2018 |
| JP | 2018-511846 | A | 4/2018 |
| JP | 2018-075259 | A | 5/2018 |
| JP | 2015-112386 | A | 6/2018 |
| JP | 63-78850 | B | 8/2018 |
| JP | 6382468 | B | 8/2018 |
| JP | 6382468 | B1 | 8/2018 |
| JP | 5397595 | B | 9/2018 |
| JP | 6397595 | B | 9/2018 |
| JP | 6420930 | B | 11/2018 |
| JP | 2019-022072 | A | 2/2019 |
| JP | 6491388 | B | 3/2019 |
| JP | 6526934 | B | 6/2019 |
| JP | 6550549 | B | 7/2019 |
| JP | 2019-197292 | A | 11/2019 |
| JP | 6719633 | B | 7/2020 |
| WO | 2010/138428 | A2 | 12/2010 |
| WO | 2017/159383 | A1 | 9/2017 |
| WO | 2018/142494 | A1 | 8/2018 |

OTHER PUBLICATIONS

Written Opinion of the International Searching Authority PCT/JP2019/016555 dated May 28, 2019 with English translation.
Re-examination Report Japanese Patent Application No. 2018-144683 dated Jul. 22, 2019 with English translation.
International Search Report PCT/JP2019/024876 dated Jul. 30, 2019 with English translation.
Written Opinion of the International Searching Authority PCT/JP2019/024876 dated Jul. 30, 2019 with English translation.
Board Decision Japanese Patent Application No. 2019-144682 dated Jul. 30, 2019 with English translation.
Why "Meg Shinonome" is So Cute? Secrets of the Booming Virtual Beauty, [online], Mogura Inc., Mar. 16, 2018, pp. 1 to 7, https://www.moguravr.com/shinonome-megu.
Office Action dated Jun. 12, 2018, issued in corresponding JP Application No. 2018-089628 with English translation.
Hasegawa Yusuke, Opening of virtual idle new time. PROJECT MariA, CG WORLD, Japan, Born Digital, Inc., Nov. 10, 2017, vol. 231, pp. 74-79.
Ando Sachio, "Live communicating animation" realized by MOCAP+Unity. CG WORLD, Japan, Works Corporation, Inc., Jun. 10, 2014, vol. 190, pp. 48-49.
Office Action dated Sep. 18, 2018 issued in corresponding responding Japanese Patent Application No. 2018-144682 with English translation.
Non-final Office Action Japanese Patent Application No. 2019-009432 dated May 21, 2019 with English translation.
Broadcast with Fans! "AniCast" with User-gifting Function, [online], Japan, XVI Inc., Apr. 5, 2018, yhe Internet <URL: http://www.xvi.co.jp/wp-content/uploads/2018/04/AniCast-PressRelease.pdf>.
Decision for Refusal dated Nov. 12, 2019 issued in corresponding Japanese Patent Application No. 2019-009432 with English translation.

(56) References Cited

OTHER PUBLICATIONS

Igor de Souza Almeida et al., "AR-based video-mediated communication: A social presence enhancing experience", 2012, 14th Symposium on Virtual and Augmented Reality, pp. 125-130.

Sang-Yup Lee et al., "Real Time 3D Avatar for Interactive Mixed Reality", Proceedings of the 2004 ACM SIGGRAPH International Conference on Virtual Reality Continuum and Its Applications in Industry, VRCAI '04, Jan. 1, 2004, XP055083687, 6 pgs.

Seung-Tak Noh et al., "An HMD-based Mixed Reality System for Avatar-Mediated Remote Collaboration with Bare-hand Interaction", International Conference on Artificial Reality and Telexistence Eurographics Symposium on Virtual Environments (2015), 8 pgs.

"Virtual Cast what is Totsu" _nicovideo [online, searched on Nov. 25, 2018], the Internet URL : https://qa.nicovideo.jp/faq/show/10740?back=front%2Fcategory%3Ashow&category_id=718&page=1&, 4 pgs., with partial English translation.

Notice of Reasons for Refusal dated Jan. 29, 2019 issued in corresponding Japanese Patent Application No. 2018-232307 with English translation.

Comprehensive explanation! "What is a "virtual cast" that anyone can become a VTuber?", Apr. 21, 2019, [search on Jan. 17,], Internet <URL: https://www.moguravr.com/virtualcast - 2 />, and the Internet </> [online],2018.

Notice of Reasons for Refusal dated Jan. 29, 2019 issued in corresponding Japanese Patent Application No. 2018-236152 with English translation.

What is TwitCasting? What kind of service?, Nov. 24, 2019, [search on Jan. 21,], Internet <URL: https://appli-world.jp/posts/1497> [online], 2018.

TwitCast block method and release method, What happens if you are an NG user? on May 22, 2019 [search on Jan. 21,], Internet <URL: https://beginner.[online]2017.Com/twitcasting-block-4529>.

Shinonome Megu, Birthday Specialised Distribution, Apr. 6, 2016, Internet <URL: https://panora.tokyo/58119 /> (documents showing well-known arts ; documents newly cited ; Documents that show well-known arts ; documents newly cited) 19 [online],2018.

Non-final Office Action dated Dec. 10, 2019 issued in corresponding Japanese Patent Application No. 2019-203861 with English translation.

Extended European Search Report dated Aug. 21, 2019 issued in corresponding EP Application No. 19173227.0.

Hsien-Tsung Chang et al., "A Dynamic Filling Room Based on Microsoft Kinect and Augmented Reality Technologies", Human-Computer Interaction, Part IV, HCII 2013, LNCS 8007, pp. 177-185, 2013, XP047034463.

G. Trogemann et al., "Mixed Realities: Integration Virtueller Objekte in Realaufnahmen", FKT Fernseh Und Kinotechnik, Fachverlag Schiele & Schon GMBH., Berlin, Germany, vol. 53, No. 1/02, Jan. 1, 1999, pp. 45-50, XP000878183.

International Search Report dated Dec. 17, 2019 issued in corresponding International Patent Application No. PCT/JP2016/043639 with English translation.

Written Opinion of the International Searching Authority dated Dec. 17, 2019 issued in corresponding International Patent Application No. PCT/JP2016/043639 with English translation.

Office Action dated Sep. 18, 2018 issued in corresponding Japanese Patent Application No. 2018-144682 with English translation.

Rejection Decision dated Dec. 4, 2018 issued in corresponding Japanese Patent Application No. JP2018-144682 with English translation.

Office Action dated Sep. 25, 2018 issued in corresponding Japanese Patent Application No. 2018-144683 with English translation.

Office Action dated Dec. 4, 2018 issued in corresponding Japanese Patent Application No. 2018-193258 with English translation.

Office Action dated Jan. 22, 2019 issued in corresponding Japanese Patent Application No. 2018-217228 with English translation.

Office Action dated Jun. 18, 2018, issued in corresponding Japanese Patent Application No. 2018-090907 with English translation.

Tarui Hideto, web browser "Blisk" for Web developers and testers based on "Chromium" was been in a formal version, [online], Impress, Inc., Nov. 2, 2016, and [Heisei 30(2018) Jun. 18 searched], Internet <URL: With restriction of https://forest.watch.impress.co.jp/docs/news / 1027949.html>.

Rejection Decision dated Mar. 19, 2019 issued in corresponding Japanese Patent Application No. 2018-144683 with English translation.

Notice of Reasons for Refusal dated Nov. 27, 2018 issued in corresponding Japanese Patent Application No. 2018-159802 with English translation.

International Search Report dated Dec. 17, 2019 issued in corresponding International Patent Application No. PCT/JP2019/043639 with English translation.

Written Opinion of the International Searching Authority dated Dec. 17, 2019 issued in corresponding International Patent Application No. PCT/JP2019/043639 with English translation.

Notice of Reasons for Refusal dated Feb. 12, 2020 issued in corresponding Japanese Patent Application No. 2018-144683 with English translation.

Non-final Office Action dated Jul. 8, 2020 issued in corresponding U.S. Appl. No. 16/552,367.

Non-final Office Action dated Jun. 23, 2020 issued in corresponding Japanese Patent Application No. 2020-025429 with English translation (9 pgs.).

International Search Report dated Apr. 2, 2020 issued in corresponding International Application No. PCT/JP2019/047384 with English translation.

Written Opinion of the International Searching Authority dated Apr. 2, 2020 issued in corresponding International Application No. PCT/JP2019/047384 with English translation.

Decision of Refusal dated Jun. 16, 2020 issued in corresponding Japanese Patent Application No. 2019-203861 with English translation.

Reconsideration Report by Examiner before Appeal dated Jun. 16, 2020 issued in corresponding Japanese Patent Application No. 2019-009432 with English translation.

Non-final Office Action dated Apr. 16, 2020 issued in corresponding U.S. Appl. No. 16/407,733.

Non-final Office Action dated Apr. 29, 2020 issued in corresponding U.S. Appl. No. 16/406,494.

Notice of Reasons for Refusal dated Oct. 13, 2020 issued in corresponding Japanese Patent Application No. 2019-170275 with English translation (18 pages).

Decision of Refusal dated Feb. 16, 2021, issued in corresponding Japanese Patent Application No. 2019-117684 with English translation (11 pgs.).

U.S. Final Office Action issued in corresponding U.S. Appl. No. 16/407,733 dated Feb. 23, 2021 (13 pgs.).

U.S. Final Office Action issued in corresponding U.S. Appl. No. 16/406,494 dated Feb. 23, 2021 (16 pgs.).

Reconsideration Report by Examiner before Appeal dated Nov. 20, 2020, issued in corresponding Japanese Ratent Application No. 2019-203861 with English translation (19 pgs.).

Communication pursuant to Article 94(3) EPC dated Nov. 24, 2020 issued in corresponding European Patent Application No. 19 173 227.0 (7 pgs.).

Notice of Allowance dated Oct. 29, 2020 issued in corresponding U.S. Appl. No. 16/552,367 (8 pgs.).

Notice of Reasons for Refusal dated Feb. 25, 2019, issued in corresponding Japanese Patent Application No. 2018-144682 with English translation (11 pgs.).

First Office Action dated Mar. 31, 2021, issued in corresponding Chinese Patent Application No. 201910374844.5 with English translation (25 pgs.).

First Office Action dated Mar. 31, 2021, issued in corresponding Chinese Patent Application No. 201910373582.0 with English translation (13 pgs.).

Notice of Reasons for Refusal dated Dec. 28, 2018, issued in corresponding Japanese Patent Application No. 2018-224331 with English translation (12 pgs.).

(56) References Cited

OTHER PUBLICATIONS

Decision for Refusal dated Apr. 13, 2021, issued in corresponding Japanese Patent Application No. 2019-170275 with English translation (9 pgs.).
Call and Response? Real-time LIVE "PROJECT MariA" using Unity, Oct. 12, 2017, [search] on Apr. 13, 1991, the internet URL: https://cgworld.jp/feature/201710-cgw231hs-mato3.html (4 pgs.).
Notice of Reasons for Refusal dated Nov. 4, 2020 issued in corresponding Japanese Patent Application No. 2019-009432 with English translation (30 pgs.).
Office Action dated Jul. 24, 2020 issued in corresponding U.S. Appl. No. 16/406,494 (15 pgs.).
Notice of Reasons for Refusal dated Dec. 1, 2020 issued in corresponding Japanese Patent Application No. 2020-025429 with English translation (14 pgs.).
Plaintiff's Evidence No. 9.2, dated Jan. 28, 2020, issued in corresponding Japanese Patent Application No. 2018-144682.
Notice of Reasons for Refusal dated Jan. 19, 2019, issued in corresponding Japanese Patent Application No. 2018-217228 with English translation (8 pgs.).
Notice of Reasons for Refusal dated Mar. 15, 2019, issued in corresponding Japanese Patent Application No. 2018-246394 with English translation (9 pgs.).
Decision of Refusal dated Jun. 20, 2019, issued in corresponding Japanese Patent Application No. 2018-246394 with English translation (7 pgs.).
Reconsideration Report by Examiner before Appeal dated Nov. 8, 2019, issued in corresponding Japanese Patent Application No. 2018-246394 with English translation (5 pgs.).
Notice of Reasons for Refusal dated May 21, 2020, issued in corresponding Japanese Patent Application No. 2018-246394 with English translation (17 pgs.).
Floating Animal Crossing strategies GEMANI, "Unlawfulness of the Doctrine of laws!" Plant Delegations [2] [online], Jul. 2, 2015,[search on Apr. 14, 2020], Internet URL:http://web.archive.org/web/20150702204105/http://www.doumori3ds.com/shokubutu2.html (8 pgs.).
Notice of Reasons for Refusal dated Sep. 28, 2020, issued in corresponding Japanese Patent Application No. 2018-246394 with English translation (9 pgs.).
Notice of Reasons for Refusal dated Jun. 12, 2020, issued in corresponding Japanese Patent Application No. 2020-012764 with English translation (7 pgs.).
Second Decision of Refusal dated Oct. 1, 2020, issued in corresponding Japanese Patent Application No. 2020-012764 with English translation (8 pgs.).
International Search Report dated Jan. 7, 2020, issued in corresponding International Patent Application No. PCT/JP2019/044998 with English translation (5 pgs.).
Written Opinion of the International Searching Authority dated Jan. 7, 2020, issued in corresponding International Patent Application No. PCT/JP2019/044998 (5 pgs.).
Non-final Office Action dated Dec. 9, 2020 issued in corresponding U.S. Appl. No. 16/407,733 (11 pgs.).
Defendant's Brief No. 1, dated Dec. 9, 2019, filed in corresponding Japanese Patent Application No. 2018-144682.
Defendant's Evidence No. 1, dated Dec. 9, 2019, filed in corresponding Japanese Patent Application No. 2018-144682.
Defendant's Evidence No. 2, dated Dec. 9, 2019, filed in corresponding Japanese Patent Application No. 2018-144682.
Evidence Statement, dated Dec. 9, 2019, filed in corresponding Japanese Patent Application No. 2018-144682.
Evidence Statement, dated Jan. 28, 2020, filed in corresponding Japanese Patent Application No. 2018-144682.
Judicial Decision, dated Sep. 24, 2020, filed in corresponding Japanese Patent Application No. 2018-144682.
Plaintiff's Brief No. 1, dated Oct. 30, 2019, filed in corresponding Japanese Patent Application No. 2018-144682.
Plaintiff's Brief No. 1, dated Jan. 28, 2020, issued in corresponding Japanese Patent Application No. 2018-144682.
Plaintiff's Evidence No. 10, dated Jan. 28, 2020, issued in corresponding Japanese Patent Application No. 2018-144682.
Plaintiff's Evidence No. 11, dated Jan. 28, 2020, issued in corresponding Japanese Patent Application No. 2018-144682.
Plaintiff's Evidence No. 9-1, dated Jan. 28, 2020, issued in corresponding Japanese Patent Application No. 2018-144682.
Plaintiff's Evidence No. 8, dated Jan. 28, 2020, issued in corresponding Japanese Patent Application No. 2018-144682.
Notice of Reasons for Refusal dated Oct. 16, 2019 issued in corresponding Japanese Patent Application No. 2019-143497 with English translation (7 pgs.).
Office Action dated Dec. 17, 2020 issued in corresponding Japanese Patent Application No. 2019-202987 with English translation (11 pgs.).
Office Action dated Jan. 21, 2021 issued in corresponding Japanese Patent Application No. 2020-120525 with English translation (11 pgs.).
Limited to Apr. $1^{st}$! Game live function added!, Reality Management Bureau [online] Apr. 1, 2019, especially the description about the game "Flappin Avatar" to be played during distribution, https://reality-notice.wriightflyer.net/aba0a23e90b9c3df9c819fc58bd39fc58bd39f09a452.aac.html.
"REALITY Avatar" that can easily debut VTuber on a smartphone, thorough explanation of how to use!, MoguLive [online], Nov. 18, 2018, especially the section "2. Create an account and create an avatar" See, [Searched Jan. 21, 2021], https://www.moguravr.com/reality-avatar-3/.
Non-final Office Action dated Nov. 17, 2020 issued in corresponding U.S. Appl. No. 16/406,494 (15 pages).
Office Action dated Jul. 31, 2020 issued in corresponding U.S. Appl. No. 16/407,733 (11 pgs.).
Office Action dated Aug. 25, 2020 issued in corresponding Japanese Patent Application No. 2019-117684 with English translation (10 pgs.).
Communication pursuant to Article 94(3) EPC dated Jun. 21, 2021, issued in corresponding European Patent Application No. 19173227.0 (9 pgs.).
Anonymous: "Motion Capture—Wikipedia", Feb. 28, 2018 URL:https://en.wikipedia.org/w/index.php?title=Motion_capture&oldid=828154525 [retrieved Jun. 10, 2021] 13 pgs.
Trial/Appeal Decision dated Aug. 17, 2021, issued in corresponding Japanese Patent Application No. 2019-203861 with English translation (39 pgs.).

* cited by examiner

| Account information | Possessed object |
|---|---|
| User ID | Object ID |

Fig. 3

| Account information | Decorative object for which display request made |
|---|---|
| User ID | Object ID |

Fig. 4

VIDEO DISTRIBUTION SYSTEM, VIDEO DISTRIBUTION METHOD, AND STORAGE MEDIUM STORING VIDEO DISTRIBUTION PROGRAM FOR DISTRIBUTING VIDEO CONTAINING ANIMATION OF CHARACTER OBJECT GENERATED BASED ON MOTION OF ACTOR

CROSS-REFERENCE TO RELATED APPLICATIONS

This application is based on and claims the benefit of priority from Japanese Patent Application Serial Nos. 2018-089612 (filed on May 8, 2018), 2018-144681 (filed on Aug. 1, 2018), 2018-144682 (filed on Aug. 1, 2018), 2018-144683 (filed on Aug. 1, 2018), 2018-193258 (Oct. 12, 2018), and 2019-009432 (Jan. 23, 2019), the contents of which are hereby incorporated by reference in their entirety.

TECHNICAL FIELD

The present disclosure relates to a video distribution system, a video distribution method, and a storage medium storing a video distribution program, for distributing a video containing animation of a character object generated based on motions of an actor.

BACKGROUND

Video distribution systems that generate an animation of a character object based on actor's motions and distribute a video including the animation of the character object have been known. Such a video distribution system is disclosed, for example, in Japanese Patent Application Publication No. 2015-184689 ("the '689 Publication").

Also known are content distribution systems that receive a request from a viewing user who is viewing contents, and in response to the request, display on a display screen a gift object corresponding to an item purchased by the viewing user. For example, in the video distribution system disclosed in Japanese Patent Application Publication No. 2012-120098 ("the '098 Publication"), a viewing user can purchase a gift item and provide the gift item to a performer (a content distributor) as a gift. The '098 Publication describes that the gift object is preferably displayed in a background region of a distributed view so as to avoid interference with the video.

Displaying a gift object to overlap with a video may deteriorate the viewing experience of a viewing user. For example, if a main part of the video is hidden behind the gift object, the viewer may feel his/her viewing of the video is impeded. In particular, when a large amount of gift object is displayed to overlap with the video, this drawback may be more severe. Therefore, in the '098 Publication, gift objects are not displayed in a content display region that displays the video, but displayed in the background region outside the content display region.

SUMMARY

It is an object of the present disclosure to provide a technical improvement which solves or alleviates at least part of the drawbacks of the prior art mentioned above. In particular, an object of the present invention is to provide a video distribution system, a video distribution method, and a storage medium storing a video distribution program, capable of displaying a gift object to overlap with a video without deteriorating the viewing experience of a viewing user.

A video distribution system according to one aspect is a video distribution system for distributing a video containing animation of a character object generated based on a motion of an actor, the video distribution system comprising: one or more computer processors; and a storage for storing a candidate list including candidates of decorative objects to be displayed in the video in association with the character object. The one or more computer processors execute computer-readable instructions to: in response to reception of a first display request from a viewing user, the first display request being sent for requesting display of a first decorative object among the decorative objects, add the first decorative object to the candidate list, and display the first decorative object in the video upon selection of the first decorative object from the candidate list.

In one aspect, the first decorative object is displayed in the video in association with a specific body part of the character object.

In one aspect, the first object is displayed in the video so as not to contact with the character object.

In one aspect, the selection of the first decorative object from the candidate list is performed by someone other than the viewing user.

In one aspect, the selection of the first decorative object from the candidate list is performed by a supporter who supports distribution of the video.

In one aspect, the selection of the first decorative object from the candidate list is performed by the actor.

In one aspect, in response to reception of a second display request from the viewing user viewing the video, the second display request being sent for requesting display of a first object that is different from the decorative objects, the one or more computer processors display the first object in the video.

In one aspect, a no-display period is provided in a distribution period of the video, and the first object and the decorative objects are displayed in the video at a timing in the distribution period of the video other than the no-display period.

In one aspect, when the second display request is received in the no-display period, the first object is displayed in the video after an end of the no-display period.

In one aspect, the one or more computer processors are configured to: receive a purchase request from the viewing user, the purchase request being sent for purchasing the first decorative object, perform a payment process in response to the purchase request, and cancel the payment process when the first decorative object is not selected before distribution of the video is ended.

In one aspect, the one or more computer processors are configured to: receive a purchase request from the viewing user, the purchase request being sent for purchasing the first decorative object, perform a payment process in response to the purchase request, and provide the viewing user with points when the first decorative object is not selected before distribution of the video is ended.

In one aspect, the one or more computer processors are configured to: receive a purchase request from the viewing user, the purchase request being sent for purchasing the first decorative object, add the first decorative object to a possession list in response to the purchase request, the possession list being a list of objects possessed by the viewing user, in response to reception of the first display request from the viewing user, the first display request being sent for requesting display of the first decorative object, add the first decorative object to the candidate list and remove the first decorative object from the possession list, and add the first decorative object to the possession list when the first decorative object is not selected before distribution of the video is ended.

In one aspect, provided is a video distribution method performed by one or more computer processors executing computer-readable instructions to distribute a video containing animation of a character object generated based on a motion of an actor. The video distribution method comprises: storing a candidate list including candidates of decorative objects to be displayed in the video in association with the character object, in response to reception of a first display request from a viewing user, the first display request being sent for requesting display of a first decorative object among the decorative objects, adding the first decorative object to the candidate list, and displaying the first decorative object in the video upon selection of the first decorative object from the candidate list.

In one aspect, provided is a non-transitory computer-readable storage medium storing a video distribution program for distributing a video containing animation of a character object generated based on a motion of an actor. The video distribution program causes one or more computer processors to: store a candidate list including candidates of decorative objects to be displayed in the video in association with the character object, in response to reception of a first display request from a viewing user, the first display request being sent for requesting display of a first decorative object among the decorative objects, add the first decorative object to the candidate list, and display the first decorative object in the video upon selection of the first decorative object from the candidate list.

Advantages

According the embodiments of the present disclosure, a gift object can be displayed to overlap with a video without deteriorating the viewing experience of a viewing user.

BRIEF DESCRIPTION OF THE DRAWINGS

FIG. 3 illustrates a possession list stored in the video distribution system of FIG. 1.

FIG. 4 illustrates a candidate list stored in the video distribution system of FIG. 1.

DESCRIPTION OF THE EMBODIMENTS

Figure 1:
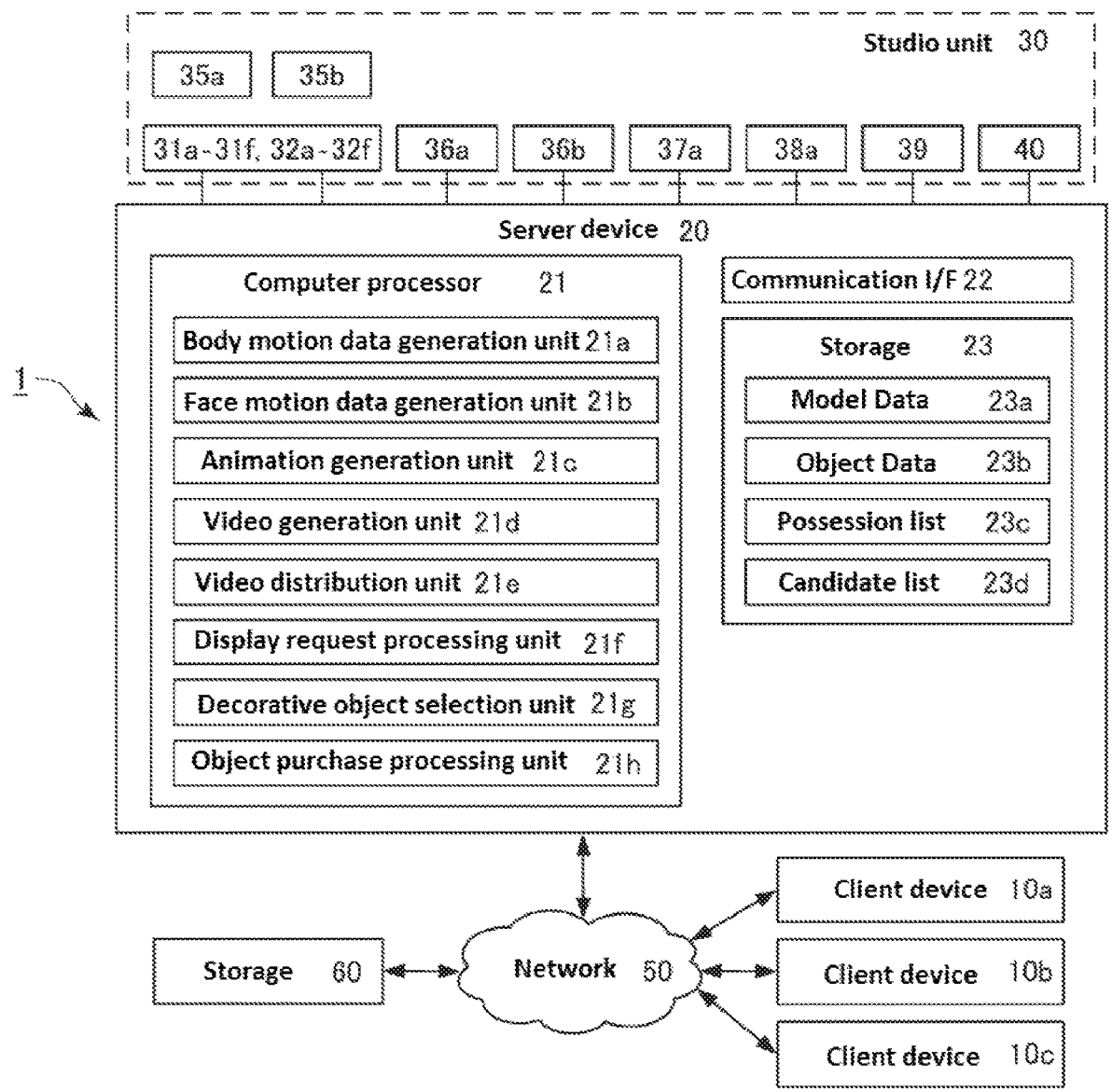
FIG. 1 is a block diagram illustrating a video distribution system according to one embodiment.

Various embodiments of the disclosure will be described hereinafter with reference to the accompanying drawings. Throughout the drawings, the same or similar elements are denoted by the same reference numerals.

Figure 2:
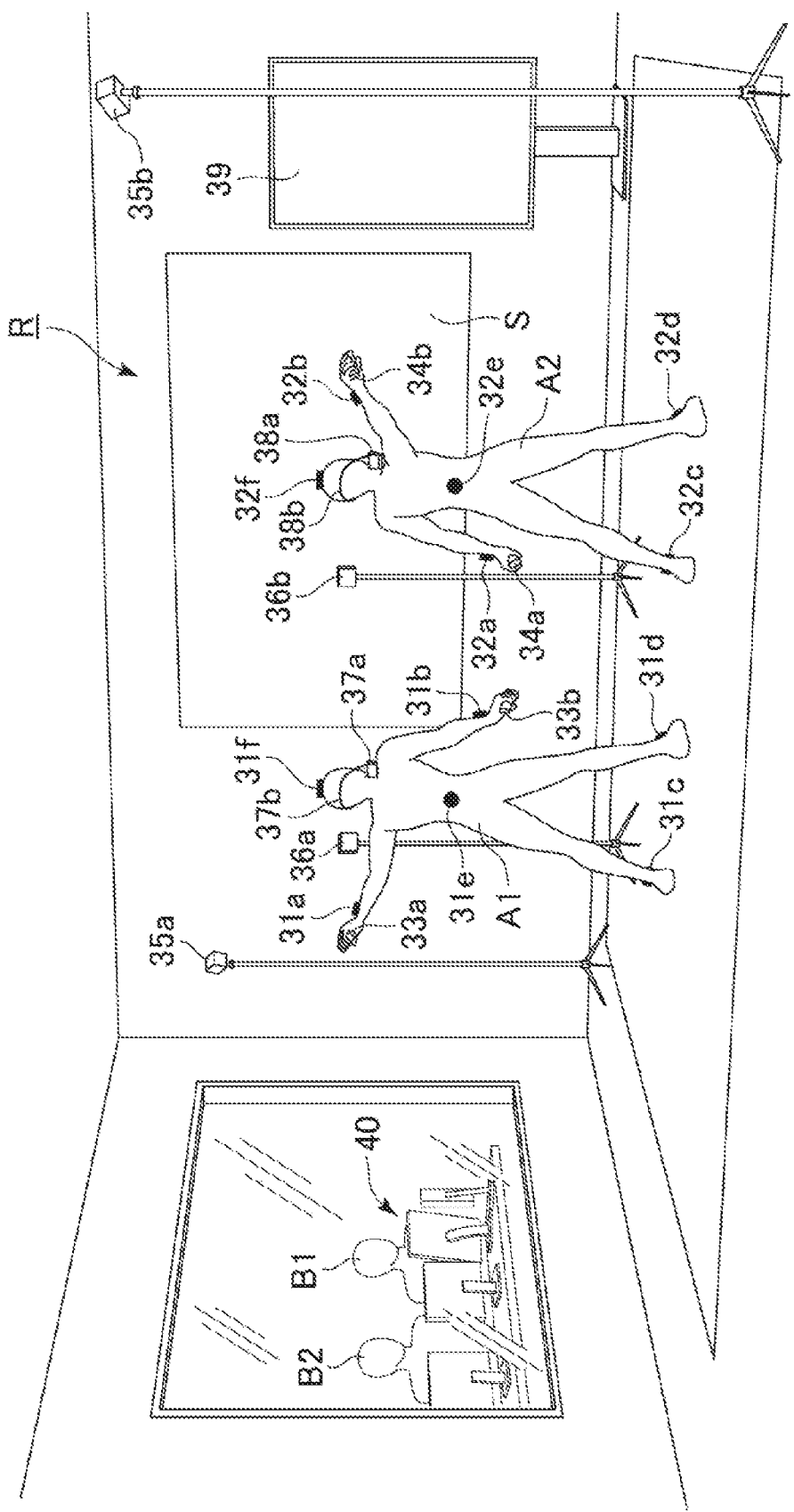
FIG. 2 schematically illustrates an installation of a studio where a video to be distributed in the video distribution system of FIG. 1 is produced.

With reference to FIGS. 1 to 4, a video distribution system according to an embodiment will be described. FIG. 1 is a block diagram illustrating a video distribution system 1 according to one embodiment, FIG. 2 schematically illustrates an installation of a studio where a video to be distributed in the video distribution system 1 is produced, and FIGS. 3 to 4 are for describing information stored in the video distribution system 1.

The video distribution system 1 includes client devices 10a to 10c, a server device 20, a studio unit 30, and a storage 60. The client devices 10a to 10c, the server device 20, and the storage 60 are communicably interconnected over a network 50. The server device 20 is configured to distribute a video including an animation of a character, as described later. The character included in the video may be motion-controlled in a virtual space.

The video may be distributed from the server device 20 to each of the client devices 10a to 10c. A first viewing user who is a user of the client device 10a, a second viewing user who is a user of the client device 10b, and a third viewing user who is a user of the client device 10c are able to view the distributed video with their respective client devices. The video distribution system 1 may include less than three client devices, or may include more than three client devices.

The client devices 10a to 10c are information processing devices such as smartphones. In addition to the smartphone, the client devices 10a to 10c each may be a mobile phone, a tablet, a personal computer, an electronic book reader, a wearable computer, a game console, or any other information processing devices that are capable of playing videos. Each of the client devices 10a to 10c may include a computer processor, a memory unit, a communication I/F, a display, a sensor unit including various sensors such as a gyro sensor, a sound collecting device such as a microphone, and a storage for storing various information.

In the illustrated embodiment, the server device 20 includes a computer processor 21, a communication I/F 22, and a storage 23.

The computer processor 21 is a computing device which loads various programs realizing an operating system and various functions from the storage 23 or other storage into a memory unit and executes instructions included in the loaded programs. The computer processor 21 is, for example, a CPU, an MPU, a DSP, a GPU, any other computing device, or a combination thereof. The computer processor 21 may be realized by means of an integrated circuit such as ASIC, PLD, FPGA, MCU, or the like. Although the computer processor 21 is illustrated as a single component in FIG. 1, the computer processor 21 may be a collection of a plurality of physically separate computer processors. In this specification, a program or instructions included in the program that are described as being executed by the computer processor 21 may be executed by a single computer processor or executed by a plurality of computer processors distributively. Further, a program or instructions included in the program executed by the computer processor 21 may be executed by a plurality of virtual computer processors.

The communication I/F 22 may be implemented as hardware, firmware, or communication software such as a TCP/IP driver or a PPP driver, or a combination thereof. The server device 20 is able to transmit and receive data to and from other devices via the communication I/F 22.

The storage 23 is a storage device accessed by the computer processor 21. The storage 23 is, for example, a magnetic disk, an optical disk, a semiconductor memory, or various other storage device capable of storing data. Various programs may be stored in the storage 23. At least some of the programs and various data that may be stored in the storage 23 may be stored in a storage (for example, a storage 60) that is physically separated from the server device 20.

Most of components of the studio unit 30 are disposed, for example, in a studio room R shown in FIG. 2. As illustrated in FIG. 2, an actor A1 and an actor A2 give performances in the studio room R. The studio unit 30 is configured to detect motions and expressions of the actor A1 and the actor A2, and to output the detection result information to the server device 20.

Both the actor A1 and the actor A2 are objects whose motions and expressions are captured by a sensor group provided in the studio unit 30, which will be described later. The actor A1 and the actor A2 are, for example, humans, animals, or moving objects that give performances. The actor A1 and the actor A2 may be, for example, autonomous robots. The number of actors in the studio room R may be one or three or more.

The studio unit 30 includes six motion sensors 31a to 31f attached to the actor A1, a controller 33a held by the left hand of the actor A1, a controller 33b held by the right hand of the actor A1, and a camera 37a attached to the head of the actor A1 via an attachment 37b. The studio unit 30 also includes six motion sensors 32a to 32f attached to the actor A2, a controller 34a held by the left hand of the actor A2, a controller 34b held by the right hand of the actor A2, and a camera 38a attached to the head of the actor A2 via an attachment 38b. A microphone for collecting audio data may be provided to each of the attachment 37b and the attachment 38b. The microphone can collect speeches of the actor A1 and the actor A2 as voice data. The microphones may be wearable microphones attached to the actor A1 and the actor A2 via the attachment 37b and the attachment 38b. Alternatively the microphones may be installed on the floor, wall or ceiling of the studio room R. In addition to the components described above, the studio unit 30 includes a base station 35a, a base station 35b, a tracking sensor 36a, a tracking sensor 36b, and a display 39. A supporter computer 40 is installed in a room next to the studio room R, and these two rooms are separated from each other by a glass window. The server device 20 may be installed in the same room as the room in which the supporter computer 40 is installed.

The motion sensors 31a to 31f and the motion sensors 32a to 32f cooperate with the base station 35a and the base station 35b to detect their position and orientation. In one embodiment, the base station 35a and the base station 35b are multi-axis laser emitters. The base station 35a emits flashing light for synchronization and then emits a laser beam about, for example, a vertical axis for scanning. The base station 35a emits a laser beam about, for example, a horizontal axis for scanning. Each of the motion sensors 31a to 31f and the motion sensors 32a to 32f may be provided with a plurality of optical sensors for detecting incidence of the flashing lights and the laser beams from the base station 35a and the base station 35b, respectively. The motion sensors 31a to 31f and the motion sensors 32a to 32f each may detect its position and orientation based on a time difference between an incident timing of the flashing light and an incident timing of the laser beam, time when each optical sensor receives the light and or beam, an incident angle of the laser light detected by each optical sensor, and any other information as necessary. The motion sensors 31a to 31f and the motion sensors 32a to 32f may be, for example, Vive Trackers provided by HTC CORPORATION. The base station 35a and the base station 35b may be, for example, base stations provided by HTC CORPORATION.

Detection result information about the position and the orientation of each of the motion sensors 31a to 31f and the motion sensors 32a to 32f that are estimated in the corresponding motion sensor is transmitted to the server device 20. The detection result information may be wirelessly transmitted to the server device 20 from each of the motion sensors 31a to 31f and the motion sensors 32a to 32f. Since the base station 35a and the base station 35b emit flashing light and a laser light for scanning at regular intervals, the detection result information of each motion sensor is updated at each interval.

In the illustrated embodiment, the six motion sensors 31a to 31f are mounted on the actor A. The motion sensors 31a, 31b, 31c, 31d, 31e, and 31f are attached to the left wrist, the right wrist, the left instep, the right instep, the hip, and top of the head of the actor A1, respectively. The motion sensors 31a to 31f may each be attached to the actor A1 via an attachment. The six motion sensors 32a to 32f are mounted on the actor A2. The motion sensors 32a to 32f may be attached to the actor A2 at the same positions as the motion sensors 31a to 31f. The motion sensors 31a to 31f and the motion sensors 32a to 32f shown in FIG. 2 are merely an example. The motion sensors 31a to 31f may be attached to various parts of the body of the actor A1, and the motion sensors 32a to 32f may be attached to various parts of the body of the actor A2. The number of motion sensors attached to the actor A1 and the actor A2 may be less than or more than six. As described above, body motions of the actor A1 and the actor A2 are detected by detecting the position and the orientation of the motion sensors 31a to 31f and the motion sensors 32a to 32f attached to the body parts of the actor A1 and the actor A2.

In one embodiment, a plurality of infrared LEDs are mounted on each of the motion sensors attached to the actor A1 and the actor A2, and light from the infrared LEDs are sensed by infrared cameras provided on the floor and/or wall of the studio room R to detect the position and the orientation of each of the motion sensors. Visible light LEDs may be used instead of the infrared LEDs, and in this case light from the visible light LEDs may be sensed by visible light cameras to detect the position and the orientation of each of the motion sensors. As described above, a light emitting unit (for example, the infrared LED or visible light LED) may be provided in each of the plurality of motion sensors attached to the actor, and a light receiving unit (for example, the infrared camera or visible light camera) provided in the studio room R senses the light from the light emitting unit to detect the position and the orientation of each of the motion sensors.

In one embodiment, a plurality of reflective markers may be used instead of the motion sensors 31a-31f and the motion sensors 32a-32f. The reflective markers may be attached to the actor A1 and the actor A2 using an adhesive tape or the like. The position and orientation of each reflective marker can be estimated by capturing images of the actor A1 and the actor A2 to which the reflective markers are attached to generate captured image data and performing image processing on the captured image data.

The controller 33a and the controller 33b supply, to the server device 20, control signals that correspond to operation of the actor A1. Similarly, the controller 34a and the controller 34b supply, to the server device 20, control signals that correspond to operation of the actor A2.

The tracking sensor 36a and the tracking sensor 36b generate tracking information for determining configuration information of a virtual camera used for constructing a virtual space included in the video. The tracking information of the tracking sensor 36a and the tracking sensor 36b is calculated as the position in its three-dimensional orthogonal coordinate system and the angle around each axis. The position and orientation of the tracking sensor 36a may be changed according to operation of the operator. The tracking sensor 36a transmits the tracking information indicating the position and the orientation of the tracking sensor 36a to the server device 20. Similarly, the position and the orientation of the tracking sensor 36b may be set according to operation of the operator. The tracking sensor 36b transmits the tracking information indicating the position and the orientation of the tracking sensor 36b to the server device 20.

The camera 37a is attached to the head of the actor A1 as described above. For example, the camera 37a is disposed so as to capture an image of the face of the actor A1. The camera 37a continuously captures images of the face of the actor A1 to obtain imaging data of the face of the actor A1. Similarly, the camera 38a is attached to the head of the actor A2. The camera 38a is disposed so as to capture an image of the face of the actor A2 and continuously capture images of the face of the actor A2 to obtain captured image data of the face of the actor A2. The camera 37a transmits the captured image data of the face of the actor A1 to the server device 20, and the camera 38a transmits the captured image data of the face of the actor A2 to the server device 20. The camera 37a and the camera 38a may be 3D cameras capable of detecting the depth of a face of a person.

The display 39 is configured to display information received from the support computer 40. The information transmitted from the support computer 40 to the display 39 may include, for example, text information, image information, and various other information. The display 39 is disposed at a position where the actor A1 and the actor A2 are able to see the display 39.

In the illustrated embodiment, the supporter computer 40 is installed in the next room of the studio room R. Since the room in which the supporter computer 40 is installed and the studio room R are separated by the glass window, an operator of the supporter computer 40 (sometimes referred to as "supporter" in the specification) is able to see the actor A1 and the actor A2. In the illustrated embodiment, supporters B1 and B2 are present in the room as the operators of the supporter computer 40.

The supporter computer 40 may be configured to be capable of changing the setting(s) of the component(s) of the studio unit 30 according to the operation by the supporter B1 and the supporter B2. The supporter computer 40 can change, for example, the setting of the scanning interval performed by the base station 35a and the base station 35b, the position or orientation of the tracking sensor 36a and the tracking sensor 36b, and various settings of other devices. At least one of the supporter B1 and the supporter B2 is able to input a message to the supporter computer 40, and the input message is displayed on the display 39.

The components and functions of the studio unit 30 shown in FIG. 2 are merely example. The studio unit 30 applicable to the invention may include various constituent elements that are not shown. For example, the studio unit 30 may include a projector. The projector is able to project a video distributed to the client device 10a or another client device on the screen S.

Next, information stored in the storage 23 in one embodiment will be described. In the illustrated embodiment, the storage 23 stores model data 23a, object data 23b, a possession list 23c, a candidate list 23d, and any other information required for generation and distribution of a video to be distributed.

The model data 23a is model data for generating animation of a character. The model data 23a may be three-dimensional model data for generating three-dimensional animation, or may be two-dimensional model data for generating two-dimensional animation. The model data 23a includes, for example, rig data (also referred to as "skeleton data") indicating a skeleton of a character, and surface data indicating the shape or texture of a surface of the character. The model data 23a may include two or more different pieces of model data. The pieces of model data may each have different rig data, or may have the same rig data. The pieces of model data may have different surface data or may have the same surface data. In the illustrated embodiment, in order to generate a character object corresponding to the actor A1 and a character object corresponding to the actor A2, the model data 23a includes at least two types of model data different from each other. The model data for the character object corresponding to the actor A1 and the model data for the character object corresponding to the actor A2 may have, for example, the same rig data but different surface data from each other.

The object data 23b includes asset data used for constructing a virtual space in the video. The object data 23b includes data for rendering a background of the virtual space in the video, data for rendering various objects displayed in the video, and data for rendering any other objects displayed in the video. The object data 23a may include object position information indicating the position of an object in the virtual space.

In addition to the above, the object data 23b may include a gift object displayed in the video in response to a display request from viewing users of the client devices 10a to 10c. The gift object may include an effect object, a normal object, and a decorative object. Viewing users are able to purchase a desired gift object.

The effect object is an object that affects the impression of the entire viewing screen of the distributed video, and is, for example, an object representing confetti. The object representing confetti may be displayed on the entire viewing screen, which can change the impression of the entire viewing screen. The effect object may be displayed so as to overlap with the character object, but it is different from the decorative object in that it is not displayed in association with a specific portion of the character object.

The normal object is an object functioning as a digital gift from a viewing user (for example, the actor A1 or the actor A2) to an actor, for example, an object resembling a stuffed toy or a bouquet. In one embodiment, the normal object is displayed on the display screen of the video such that it does not contact the character object. In one embodiment, the normal object is displayed on the display screen of the video such that it does not overlap with the character object. The normal object may be displayed in the virtual space such that it overlaps with an object other than the character object. The normal object may be displayed so as to overlap with the character object, but it is different from the decorative object in that it is not displayed in association with a specific portion of the character object. In one embodiment, when the normal object is displayed such that it overlaps with the character object, the normal object may hide portions of the character object other than the head including the face of the character object but does not hide the head of the character object.

The decorative object is an object displayed on the display screen in association with a specific part of the character object. In one embodiment, the decorative object displayed on the display screen in association with a specific part of the character object is displayed adjacent to the specific part of the character object on the display screen. In one embodiment, the decorative object displayed on the display screen in association with a specific part of the character object is displayed such that it partially or entirely covers the specific part of the character object on the display screen. The specific part may be specified by three-dimensional position information that indicates a position in a three-dimensional coordinate space, or the specific part may be associated with position information in the three-dimensional coordinate space. For example, a specific part in the head of a character may be specified in the units of the front left side, the front right side, the rear left side, the rear right side, the middle front side, and the middle rear side of the head, the left eye, the right eye, the left ear, the right ear, and the whole hair.

The decorative object is an object that can be attached to a character object, for example, an accessory (such as a headband, a necklace, an earring, etc.), clothes (such as a T-shirt), a costume, and any other object which can be attached to the character object. The object data 23b corresponding to the decorative object may include attachment position information indicating which part of the character object the decorative object is associated with. The attachment position information of a decorative object may indicate to which part of the character object the decorative object is attached. For example, when the decorative object is a headband, the attachment position information of the decorative object may indicate that the decorative object is attached to the "head" of the character object. When the attachment position of a decorative object is specified as a position in a three-dimensional coordinate space, the attachment position information may be associated with a plurality of positions in the three-dimensional coordinate space. For example, the attachment position information that indicates the position to which a decorative object representing "a headband" is attached may be associated with two parts of "the rear left side of the head" and "the rear right side of the head" of the character object. In other words, the decorative object representing "a headband" may be attached to both "the rear left side of the head" and "the rear right side of the head" When the decorative object is a T-shirt, the attachment position information of the decorative object may indicate that the decorative object is attached to the "torso" of the character object.

A duration of time of displaying the gift objects may be set for each gift object depending on its type. In one embodiment, the duration of displaying the decorative object may be set longer than the duration of displaying the effect object and the duration of displaying the normal object. For example, the duration of displaying the decorative object may be set to 60 seconds, while the duration of displaying the effect object may be set to 5 seconds and the duration of displaying the normal object may be set to 10 seconds.

The possession list 23c is a list showing gift objects possessed by viewing users of a video. An example of the possession list 23c is shown in FIG. 3. As illustrated, in the possession list 23c, an object ID for identifying a gift object possessed by a viewing user is stored in association with account information of the viewing user (for example, user ID of the viewing user). The viewing users include, for example, the first to third viewing users of the client devices 10a to 10c.

The candidate list 23d is a list of decorative objects for which a display request has been made from a viewing user. As will be described later, a viewing user who possesses a decorative object(s) is able to make a request to display his/her own decorative objects. In the candidate list 23d, object IDs for identifying decorative objects are stored in association with the account information of the viewing user who has made a request to display the decorative objects. The candidate list 23d may be created for each distributor. The candidate list 23d may be stored, for example, in association with distributor identification information that identify a distributor(s) (the actor A1, the actor A2, the supporter B1, and/or the supporter B2).

Functions realized by the computer processor 21 will be now described more specifically. The computer processor 21 functions as a body motion data generation unit 21a, a face motion data generation unit 21b, an animation generation unit 21c, a video generation unit 21d, a video distribution unit 21e, a display request processing unit 21f, a decorative object selection unit 21g, and an object purchase processing unit 21h by executing computer-readable instructions included in a distributed program. At least some of the functions that can be realized by the computer processor 21 may be realized by a computer processor other than the computer processor 21 of the video distribution system 1. For example, at least some of the functions realized by the computer processor 21 may be realized by a computer processor mounted on the supporter computer 40.

The body motion data generation unit 21a generates first body motion data of each part of the body of the actor A1 based on detection result information of the corresponding motion sensors 31a to 31f, and generates second body motion data, which is a digital representation of the position and the orientation of each part of the body of the actor A2, based on detection result information of the corresponding motion sensors 32a to 32f. In the specification, the first body motion data and the second body motion data may be collectively referred to simply as "body motion data." The body motion data is serially generated with time as needed. For example, the body motion data may be generated at predetermined sampling time intervals. Thus, the body motion data can represent body motions of the actor A1 and the actor A2 in time series as digital data. In the illustrated embodiment, the motion sensors 31a to 31f and the motion sensors 32a to 32f are attached to the left and right limbs, the waist, and the head of the actor A1 and the actor A2, respectively. Based on the detection result information of the motion sensors 31a to 31f and the motion sensors 32a to 32f, it is possible to digitally represent the position and orientation of the substantially whole body of the actor A1 and the actor A2 in time series. The body motion data can define, for example, the position and rotation angle of bones corresponding to the rig data included in the model data 23a.

The face motion data generation unit 21b generates first face motion data, which is a digital representation of motions of the face of the actor A1, based on captured image data of the camera 37a, and generates second face motion data, which is a digital representation of motions of the face of the actor A2, based on captured image data of the camera 38a. In the specification, the first face motion data and the second face motion data may be collectively referred to simply as "face motion data." The face motion data is serially generated with time as needed. For example, the face motion data may be generated at predetermined sampling time intervals. Thus, the face motion data can digitally represent facial motions (changes in facial expression) of the actor A1 and the actor A2 in time series.

The animation generation unit 21c is configured to apply the body motion data generated by the body motion data generation unit 21a and the face motion data generated by the face motion data generation unit 21b to predetermined model data included in the model data 23a in order to generate an animation of a character object that moves in a virtual space and whose facial expression changes. More specifically, the animation generation unit 21c may generate an animation of a character object moving in synchronization with the motion of the body and facial expression of the actor A1 based on the first body motion data and the first face motion data related to the actor A1, and generate an animation of a character object moving in synchronization with the motion of the body and facial expression of the actor A2 based on the second body motion data and the second face motion data related to the actor A2. In the specification, a character object generated based on the motion and expression of the actor A1 may be referred to as a "first character object", and a character object generated based on the motion and expression of the actor A2 may be referred to as a "second character object."

The video generation unit 21d constructs a virtual space using the object data 23b, and generates a video that includes the virtual space, the animation of the first character object corresponding to the actor A1, and the animation of the second character object corresponding to the actor A2. The first character object is disposed in the virtual space so as to correspond to the position of the actor A1 with respect to the tracking sensor 36a, and the second character object is disposed in the virtual space so as to correspond to the position of the actor A2 with respect to the tracking sensor 36a. Thus, it is possible to change the position and the orientation of the first character object and the second character object in the virtual space by changing the position or the orientation of the tracking sensor 36a.

In one embodiment, the video generation unit 21d constructs a virtual space based on tracking information of the tracking sensor 36a. For example, the video generation unit 21d determines configuration information (the position in the virtual space, a gaze position, a gazing direction, and the angle of view) of the virtual camera based on the tracking information of the tracking sensor 36a. Moreover, the video generation unit 21d determines a rendering area in the entire virtual space based on the configuration information of the virtual camera and generates moving image information for displaying the rendering area in the virtual space.

The video generation unit 21d may be configured to determine the position and the orientation of the first character object and the second character object in the virtual space, and the configuration information of the virtual camera based on tracking information of the tracking sensor 36b instead of or in addition to the tracking information of the tracking sensor 36a.

The video generation unit 21d is able to include voices of the actor A1 and the actor A2 collected by the microphone in the studio unit 30 with the generated moving image.

As described above, the video generation unit 21d generates an animation of the first character object moving in synchronization with the motion of the body and facial expression of the actor A1, and an animation of the second character moving in synchronization with the motion of the body and facial expression of the actor A2. The video generation unit 21d then includes the voices of the actor A1 and the actor A2 with the animations respectively to generate a video for distribution.

The video distribution unit 21e distributes the video generated by the video generation unit 21d The video is distributed to the client devices 10a to 10c and other client devices over the network 50. The received video is reproduced in the client devices 10a to 10c.

The video may be distributed to a client device (not shown) installed in the studio room R, and projected from the client device onto the screen S via a short focus projector. The video may also be distributed to the supporter computer 40. In this way, the supporter B1 and the supporter B2 can check the viewing screen of the distributed video.

Figure 5:
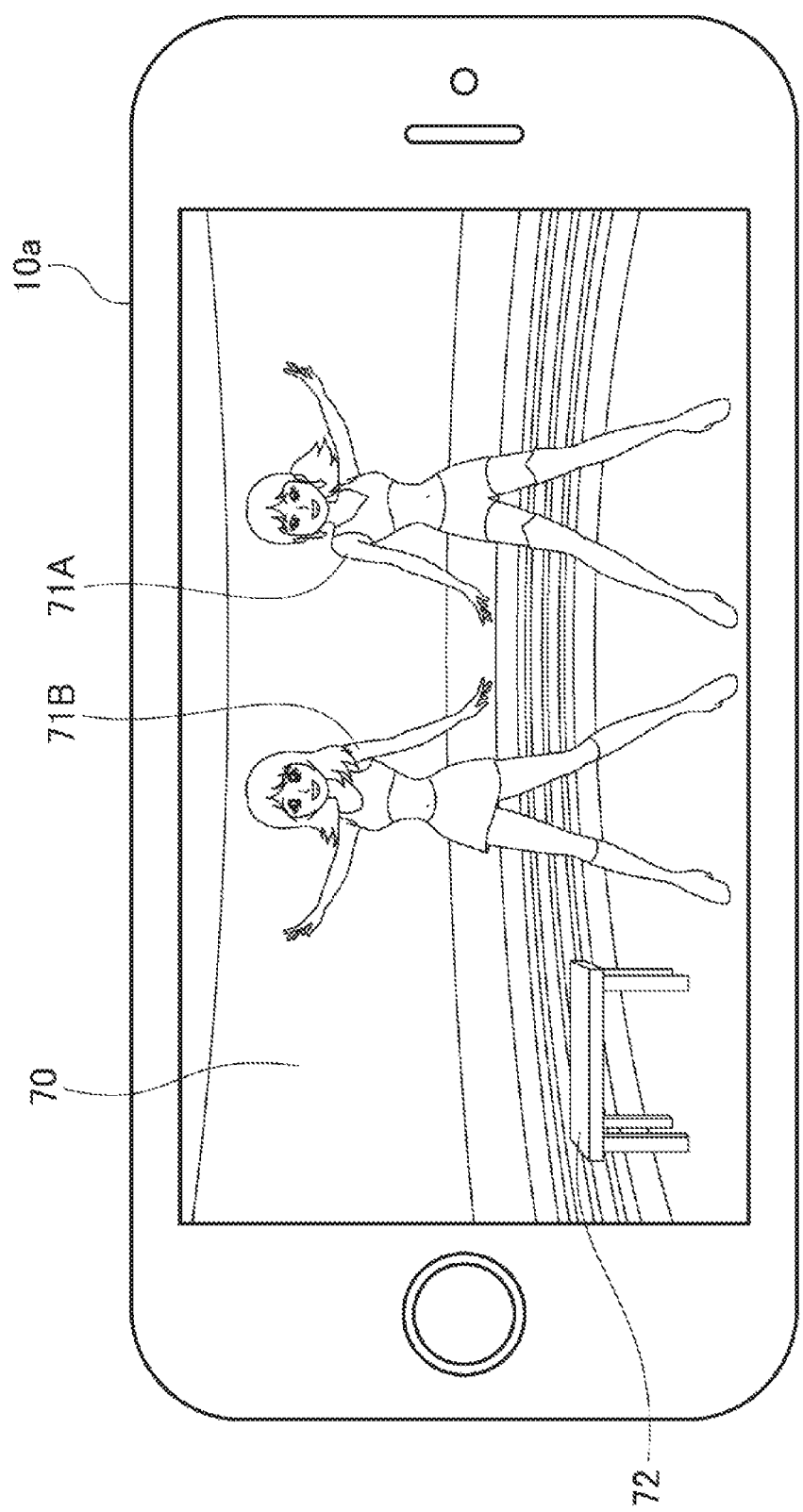
FIG. 5 illustrates an example of a video displayed on the client device 10a in one embodiment. An animation of a character object is included in FIG. 5.

An example of the screen on which the video distributed from the server device 20 to the client device 10a and reproduced by the client device 10a is displayed is illustrated in FIG. 5. As shown, a display image 70 of the video distributed from the server device 20 is displayed on the display of the client device 10a. The display image 70 displayed on the client device 10a includes a character object 71A corresponding to the actor A1, a character object 71B corresponding to the actor A2, a table object 72a representing a table, in a virtual space. The object 72 is not a gift object, but is one of objects used for constructing a virtual space included in the object data 23b. The character object 71A is generated by applying the first body motion data and the first face motion data of the actor A1 to the model data for the actor A1 included in the model data 23a. The character object 71A is motion-controlled based on the first body motion data and the first face motion data. The character object 71B is generated by applying the second body motion data and the second face motion data of the actor A2 to the model data for the actor A2 included in the model data 23a. The character object 71B is motion-controlled based on the second body motion data and the second face motion data. Thus, the character object 71A is controlled to move in the screen in synchronization with the motions of the body and facial expression of the actor A1, and the character object 71B is controlled to move in the screen in synchronization with the motions of the body and facial expression of the actor A2.

As described above, the video from the server device 20 may be distributed to the supporter computer 40. The video distributed to the supporter computer 40 is displayed on the supporter computer 40 in the same manner as FIG. 5. The supporter B1 and the supporter B2 are able to change the configurations of the components of the studio unit 30 while viewing the video reproduced by the supporter computer 40. In one embodiment, when the supporter B1 and the supporter B2 wish to change the angle of the character object 71A and the character object 71B in the video being distributed, they can cause an instruction signal for changing the orientation of the tracking sensor 36a to be sent from the supporter computer 40 to the tracking sensor 36a. The tracking sensor 36a is able to change its orientation in accordance with the instruction signal. For example, the tracking sensor 36a may be rotatably attached to a stand via a pivoting mechanism that includes an actuator disposed around the axis of the stand. When the tracking sensor 36a received an instruction signal instructing to change its orientation, the actuator of the pivoting mechanism may be driven based on the instruction signal, and the tracking sensor 36a may be turned by an angle according to the instruction signal. In one embodiment, the supporter B1 and the supporter B2 may cause the supporter computer 40 to transmit an instruction for using the tracking information of the tracking sensor 36b to the tracking sensor 36a and the tracking sensor 36b, instead of the tracking information from the tracking sensor 36a.

In one embodiment, when the supporter B1 and the supporter B2 determine that some instructions are needed for the actor A1 or the actor A2 as they are viewing the video reproduced on the supporter computer 40, they may input a message indicating the instruction(s) into the support computer 40 and the message may be output to the display 39. For example, the supporter B1 and the supporter B2 can instruct the actor A1 or the actor A2 to change his/her standing position through the message displayed on the display 39.

The display request processing unit 21f receives a display request to display a gift object from a client device of a viewing user, and performs processing according to the display request. Each viewing user is able to transmit a display request to display a gift object to the server device 20 by operating his/her client device. For example, the first viewing user can transmit a display request to display a gift object to the server device 20 by operating the client device 10a. The display request to display a gift object may include the user ID of the viewing user and the identification information (object ID) that identifies the object for which the display request is made.

As described above, the gift object may include the effect object, the normal object, and the decorative object. The effect object and the normal object are examples of the first object. In addition, a display request for requesting display of the effect object or the normal object is an example of a second display request. Upon receipt of a display request to display a gift object from a client device of a viewing user, the display request processing unit 21f may determine what type of gift object the request is requesting to display. For example, the display request processing unit 21f may determine which of the effect object, the normal object, or the decorative object the display request is requesting to display. The display request processing unit 21f may determine what type of gift object the request is requesting to display based on the object ID included in the display request.

Figure 6:
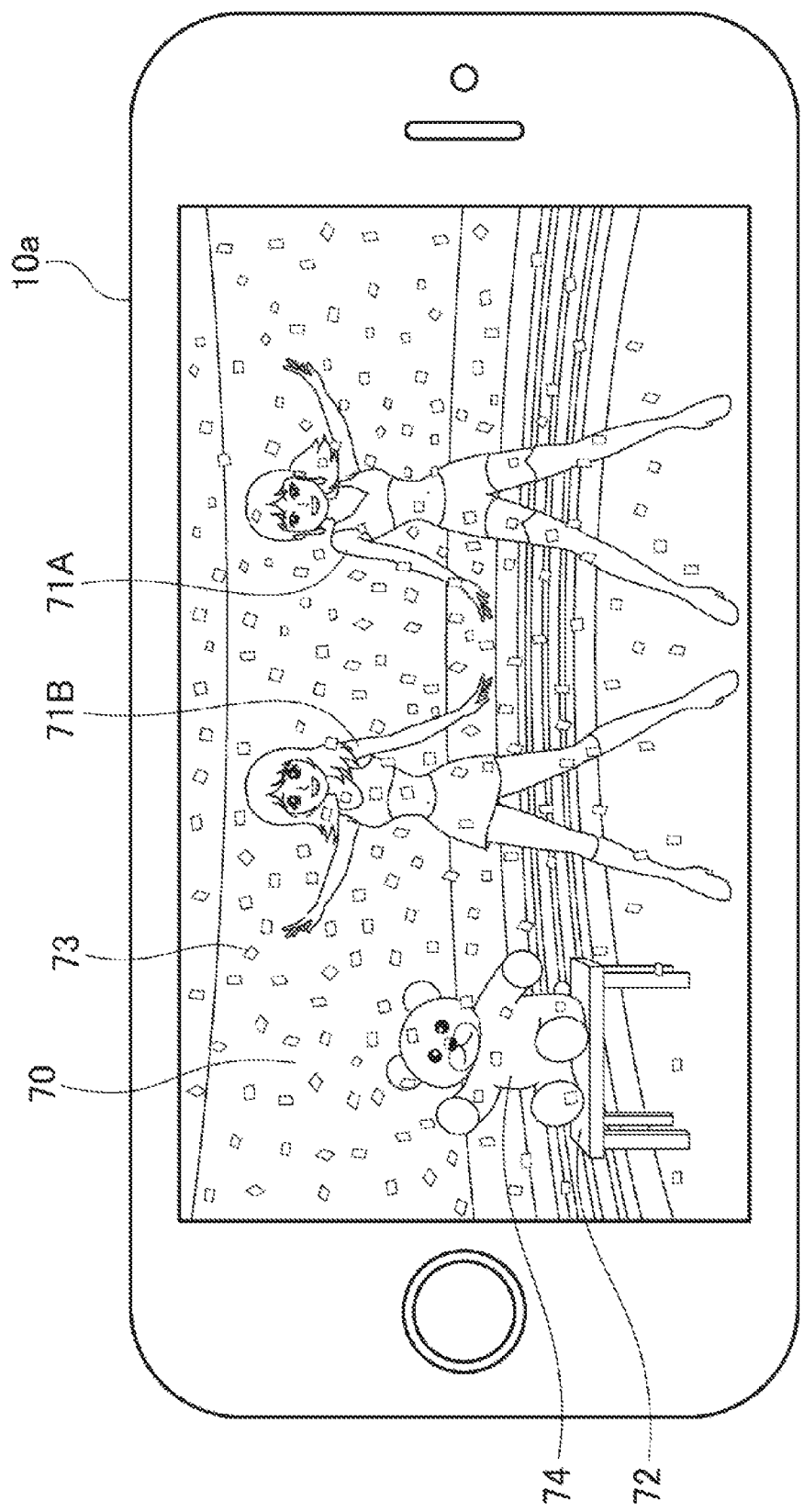
FIG. 6 illustrates an example of a video displayed on the client device 10a in one embodiment. A normal object is included in FIG. 6.

In one embodiment, when the display request processing unit 21f received a display request to display a specific effect object from a viewing user, the display request processing unit 21f performs a process, in response to the display request, to display the effect object for which the display request is made in the display image 70 of the video. For example, when a display request to display an effect object simulating confetti is made, the display request processing unit 21f displays in the display image 70 an effect object 73 simulating confetti based on the display request as shown in FIG. 6.

In one embodiment, when the display request processing unit 21f received a display request to display a specific normal object from a viewing user, the display request processing unit 21f performs a process, in response to the display request, to display the normal object for which the display request is made in the video 70. For example, when a display request to display a normal object simulating a stuffed bear is made, the display request processing unit 21f displays a normal object 74 simulating a stuffed bear in the display image 70 based on the display request as shown in FIG. 6.

The display request for the normal object 74 may include a display position specifying parameter for specifying the display position of the normal object 74 in the virtual space. In this case, the display request processing unit 21f displays the normal object 74 at the position in the virtual space specified by the display position specifying parameter. For example, the display position specifying parameter may specify the upper position of the table object 72a representing a table as the display position of the normal object 74. A viewing user is able to specify the position where the normal object is to be displayed by using the display position specifying parameter while watching the layouts of the character object 71A, the character object 71B, the gift object, and other objects included in the video 70.

In one embodiment, the normal object 74 may be displayed such that it moves within the display image 70 of the video. For example, the normal object 74 may be displayed such that it falls from the top to the bottom of the screen. In this case, the normal object 74 may be displayed in the display image 70 during the fall, which is from when the object starts to fall and to when the object has fallen to the floor of the virtual space of the video 70, and may disappear from the display image 70 after it has fallen to the floor. A viewing user can view the falling normal object 74 from the start of the fall to the end of the fall. The moving direction of the normal object 74 in the screen can be specified as desired. For example, the normal object 74 may be displayed in the display image 70 so as to move from the left to the right, the right to the left, the upper left to the lower left, or any other direction in the video 70. The normal object 74 may move on various paths. For example, the normal object 74 can move on a linear path, a circular path, an elliptical path, a spiral path, or any other paths. The viewing user may include, in the display request to display the normal object, a moving direction parameter that specifies the moving direction of the normal object 74 and/or a path parameter that specifies the path on which the normal object 74 moves, in addition to or in place of the display position specifying parameter. In one embodiment, among the effect objects and the normal objects, those whose size in the virtual space is smaller than a reference size (for example, a piece of paper of confetti of the effect object 73) may be displayed such that a part or all of the object(s) is overlapped with the character object 71A and/or the character object 71B. In one embodiment, among the effect objects and the normal objects, those whose size in the virtual space is larger than the reference size (for example, the normal object 74 (the stuffed bear)) may be displayed at a position where the object is not overlapped with the character object. In one embodiment, among the effect objects and the normal objects, if those whose size in the virtual space is larger than the reference size (for example, the normal object 74 (the stuffed bear)) is overlapped with the character object 71A and/or the character object 71B, the object is displayed behind the overlapping character object.

In one embodiment, when the display request processing unit 21f received a display request to display a specific decorative object from a viewing user, the display request processing unit 21f adds the decorative object for which the display request is made to the candidate list 23d based on the display request. The display request to display the decorative object is an example of a first display request. For example, the display request processing unit 21f may store, in the candidate list 23d, identification information (object ID) identifying the specific decorative object for which the display request has been made from the viewing user, in association with the user ID of the viewing user (see FIG. 4). When more than one display request to display a decorative object is made, for each of the display requests, the user ID of the viewing user who made the display request and the decorative object ID of the decorative object for which the display request is made by the viewing user are associated with each other and stored in the candidate list 23d.

In one embodiment, in response to one or more of the decorative objects included in the candidate list 23d being selected, the decorative object selection unit 21g performs a process to display the selected decorative object in the display image 70 of the video. In the specification, a decorative object selected from the candidate list 23d may be referred to as a "selected decorative object".

Figure 8:
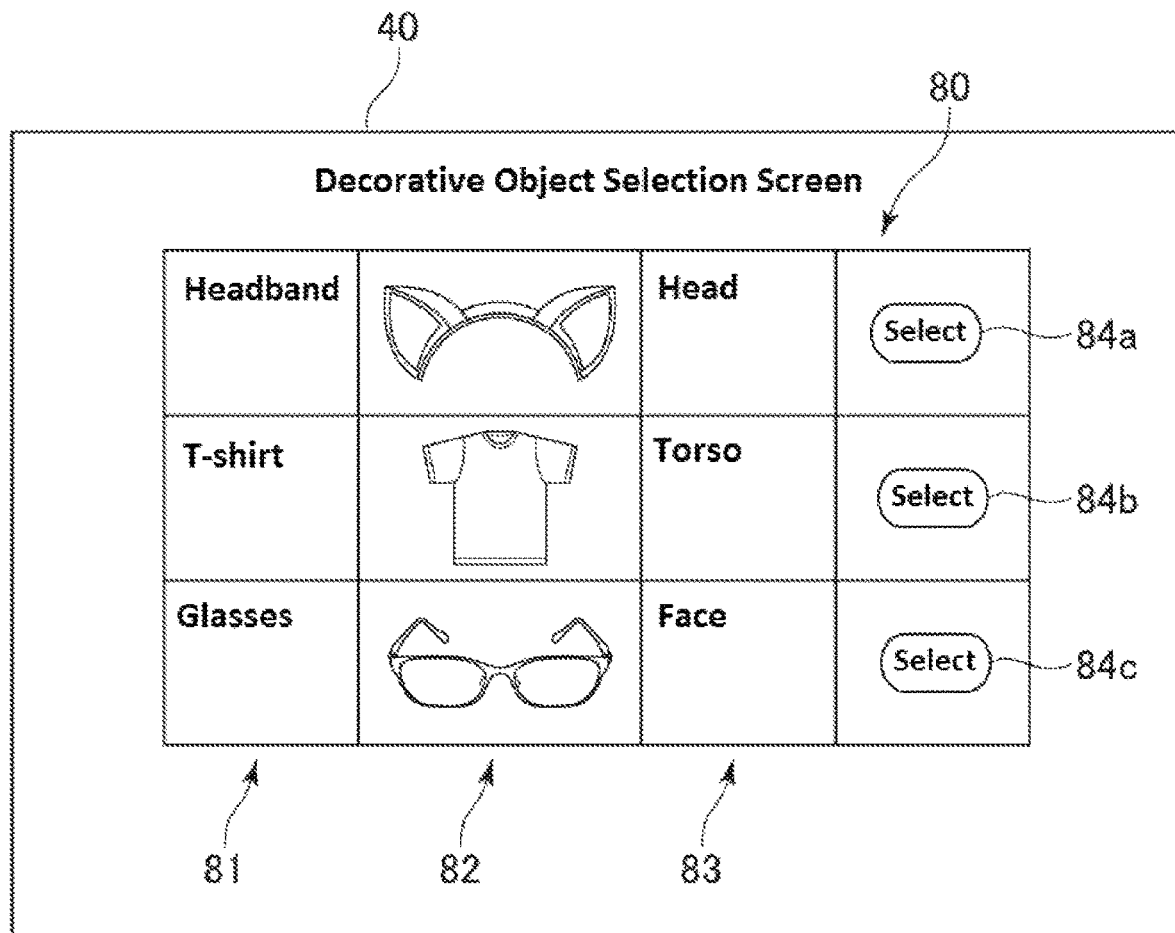
FIG. 8 schematically illustrates an example of a decorative object selection screen for selecting a desired decorative object from among the decorative objects included in the candidate list.

The selection of the decorative object from the candidate list 23d is made, for example, by the supporter B1 and/or the supporter B2 who operate the supporter computer 40. In one embodiment, the supporter computer 40 displays a decorative object selection screen. FIG. 8 shows an example of a decorative object selection screen 80 in one embodiment. The decorative object selection screen 80 is displayed, for example, on the display of the supporter computer 40. The decorative object selection screen 80 shows, for example, each of the plurality of decorative objects included in the candidate list 23d in a tabular form. As illustrated, the decorative object selection screen 80 in one embodiment includes a first column 81 showing the type of the decorative object, a second column 82 showing the image of the decorative object, and a third column 83 showing the body part of a character object associated with the decorative object. Further, on the decorative object selection screen 80, selection buttons 84a to 84c for selecting each decorative object are displayed. Thus, the decorative object selection screen 80 displays decorative objects that can be selected as the selected decorative object.

Figure 7:
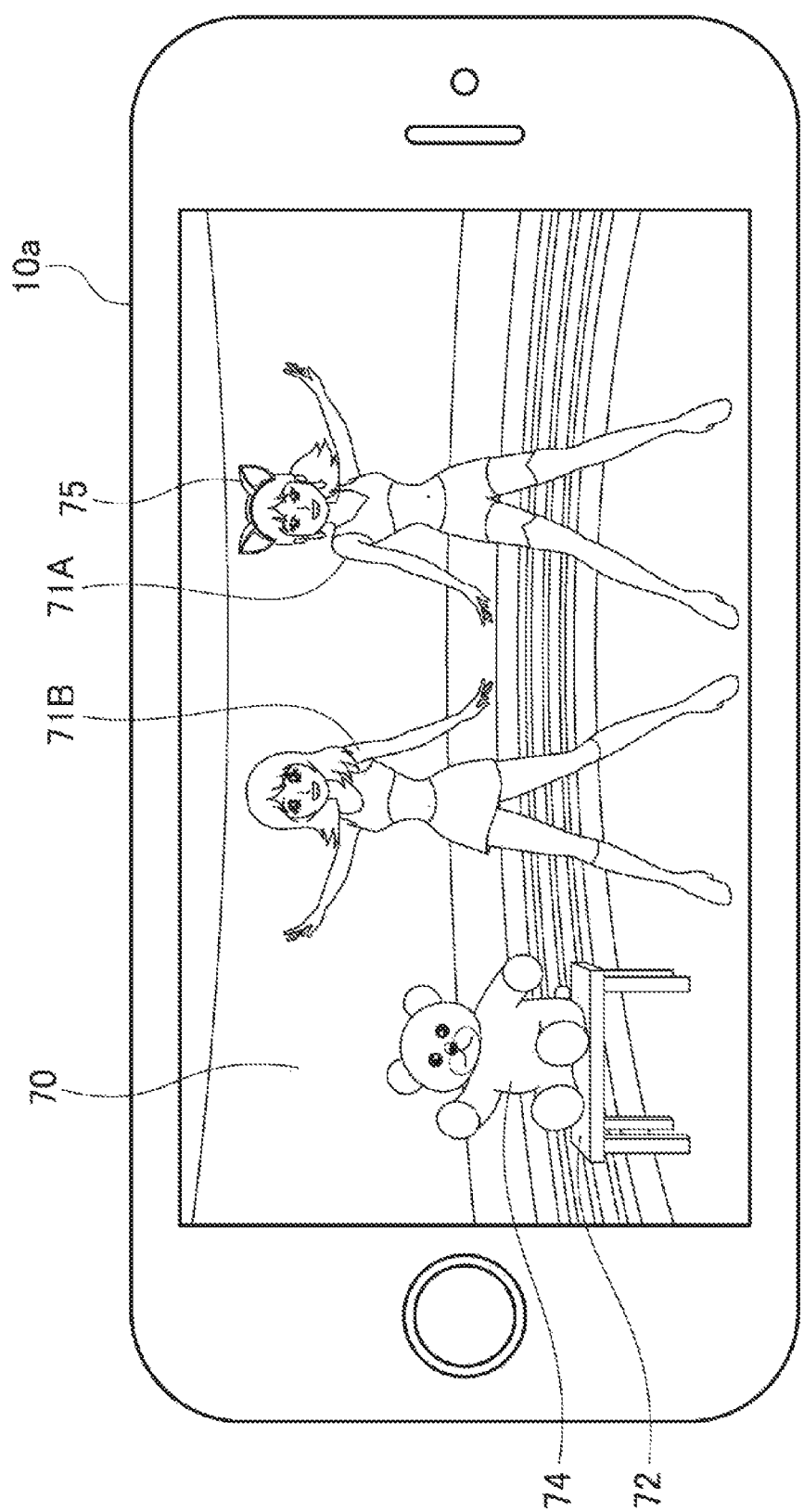
FIG. 7 illustrates an example of a video displayed on the client device 10a in one embodiment. A decorative object is included in FIG. 7.

The supporters B1 and B2 are able to select one or more of the decorative objects shown on the decorative object selection screen 80. For example, the supporter B1 and the supporter B2 are able to select a headband by selecting the selection button 84a. When it is detected by the decorative object selection unit 21g that the headband is selected, the display request processing unit 21f displays the selected decorative object 75 that simulates the selected headband on the display screen 70 of the video, as shown in FIG. 7. The selected decorative object 75 is displayed on the display image 70 in association with a specific body part of a character object. The selected decorative object 75 may be displayed such that it contacts with the specific body part of the character object. For example, since the selected decorative object 75 simulating the headband is associated with the head of the character object, it is attached to the head of the character object 71A as shown in FIG. 7. The decorative object may be displayed on the display screen 70 such that it moves along with the motion of the specific part of the character object. For example, when the head of the character object 71A with the headband moves, the selected decorative object 75 simulating the headband moves in accordance with the motion of the head of the character object 71A as if the headband is attached to the head of the character object 71A.

As described above, the object data 23b may include attachment position information indicating which part of the character object the decorative object is associated with. In one embodiment, the decorative object selection unit 21g may prohibit selection of a decorative object included in the candidate list 23d as the selected decorative object 75, if the decorative object is to be attached to a body part that overlaps with the body part indicated by the attachment position information of another decorative object already attached to the character object. For example, a headband associated with "the rear left side of the head" and "the rear right side of the head" and a hair accessory associated with "the rear left side of the head" cannot be attached at the same time since these decorative objects overlap with each other in "the rear left side of the head" In contrast, a headband associated with "the rear left side of the head" and "the rear right side of the head" and an earring associated with "the left ear (of the head)" and "the right ear (of the head)" can be attached at the same time since these decorative objects do not overlap with each other in any specific body part of a character object.

The selected decorative object 75 may be displayed on the display screen 70 in association with the character object 71B instead of the character object 71A. Alternatively, the selected decorative object 75 may be displayed on the display screen 70 in association with the character object 71A and the character object 71B.

In one embodiment, the decorative object selection screen 80 may be configured to exclude information identifying a user who holds the decorative object or a user who has made a display request to display the decorative object. By configuring the decorative object selection screen 80 in this manner, it is possible to prevent a selector from giving preference to a particular user when selecting a decorative object.

In one embodiment, the decorative object selection screen 80 may display, for each decorative object, information regarding a user who holds the decorative object or a user who made a display request for the decorative object. Such information displayed for each decorative object may include, for example, the number of times the user who made the display request for the decorative object has made display requests for the decorative object so far and the number of times the decorative object has been actually selected (for example, information indicating that the display request to display the decorative object has been made five times and the decorative object has been selected two times among the five times), the number of times the user has viewed the video of the character object 71A and/or the character object 71B, the number of times the user has viewed videos (regardless of whether the character object 71A and/or the character object 71B appears in the videos or not), the amount of money which the user spent for the gift object, the number of times the user has purchased the objects, the points possessed by the user that can be used in the video distribution system 1, the level of the user in the video distribution system 1, and any other information about the user who made the display request to display the respective decorative object. According to this embodiment, it is possible to select the decorative object based on the behavior and/or the viewing history of the user who has made the display request for the decorative object in the video distribution system 1.

In one embodiment, a constraint(s) may be imposed on the display of decorative objects to eliminate overlapping. For example, with regard to the character object 71A, if a decorative object associated with the specific body part of the character object is already selected, selection of other decorative objects associated with the specific body part may be prohibited. As shown in the embodiment of FIG. 7, when the headband associated with the "head" of the character object 71B is already selected, the other decorative objects associated with the "head" (for example, a decorative object simulating a "hat" associated with the head) are not displayed on the decorative object selection screen 80, or a selection button for selecting the decorative object simulating the hat is disabled on decorative object selection screen 80. According to this embodiment, it is possible to prevent the decorative object from being displayed so as to overlap with a specific part of the character object.

The decorative object selection screen 80 may be displayed on another device instead of or in addition to the supporter computer 40. For example, the decorative object selection screen 80 may be displayed on the display 39 and/or the screen S in the studio room R. In this case, the actor A1 and the actor A2 are able to select a desired decorative object based on the decorative object selection screen 80 displayed on the display 39 or the screen S. Selection of the decorative object by the actor A1 and the actor A2 may be made, for example, by operating the controller 33a, the controller 33b, the controller 34a, or the controller 34b.

In one embodiment, in response to a request from a viewing user of the video, the object purchase processing unit 21h transmits, to a client device of the viewing user (for example, the client device 10a), purchase information of each of the plurality of gift objects that can be purchased in relation to the video. The purchase information of each gift object may include the type of the gift object (the effect object, the normal object, or the decorative object), the image of the gift object, the price of the gift object, and any other information necessary to purchase the gift object. The viewing user is able to select a gift object to purchase it considering the gift object purchase information displayed on the client device 10a. The selection of the gift objects to be purchased may be performed by operating the client device 10a. When a gift object to be purchased is selected by the viewing user, a purchase request for the gift object is transmitted to the server device 20. The object purchase processing unit 21h performs a payment process based on the purchase request. When the payment process is completed, the purchased gift object is held by the viewing user. In this case, the object ID of the purchased gift object is stored in the possession list 23c in association with the user ID of the viewing user who purchased the object.

Gift objects that can be purchased may be different for each video. The gift objects may be made purchasable in two or more different videos. That is, the purchasable gift objects may include a gift object unique to each video and a common gift object that can be purchased in multiple videos. For example, the effect object that simulates confetti may be the common gift object that can be purchased in the two or more different videos.

In one embodiment, when a user purchases an effect object while viewing a video, the purchased effect object may be displayed automatically in the video that the user is viewing in response to completion of the payment process for purchasing the effect object. In the same manner, when a user purchases a normal object while viewing a video, the purchased normal object may be automatically displayed in the video that the user is viewing in response to completion of the payment process for purchasing the normal object.

In another embodiment, in response to completion of the payment process performed by the object purchase processing unit 21h for the effect object to be purchased, a notification of the completion of the payment process may be sent to the client device 10a, and a confirmation screen may be displayed to confirm whether the viewing user wants to make a display request to display the purchased effect object on the client device 10a. When the viewing user selects to make the display request for the purchased effect object, the display request to display the purchased effect object may be sent from the client device of the viewing user to the display request processing unit 21f, and the display request processing unit 21f may perform the process to display the purchased effect object in the display image 70 of the video. Even when the normal object is to be purchased, a confirmation screen may be displayed on the client device 10a to confirm whether the viewing user wants to make a display request to display the purchased normal object, in the same manner as above.

Figure 9:
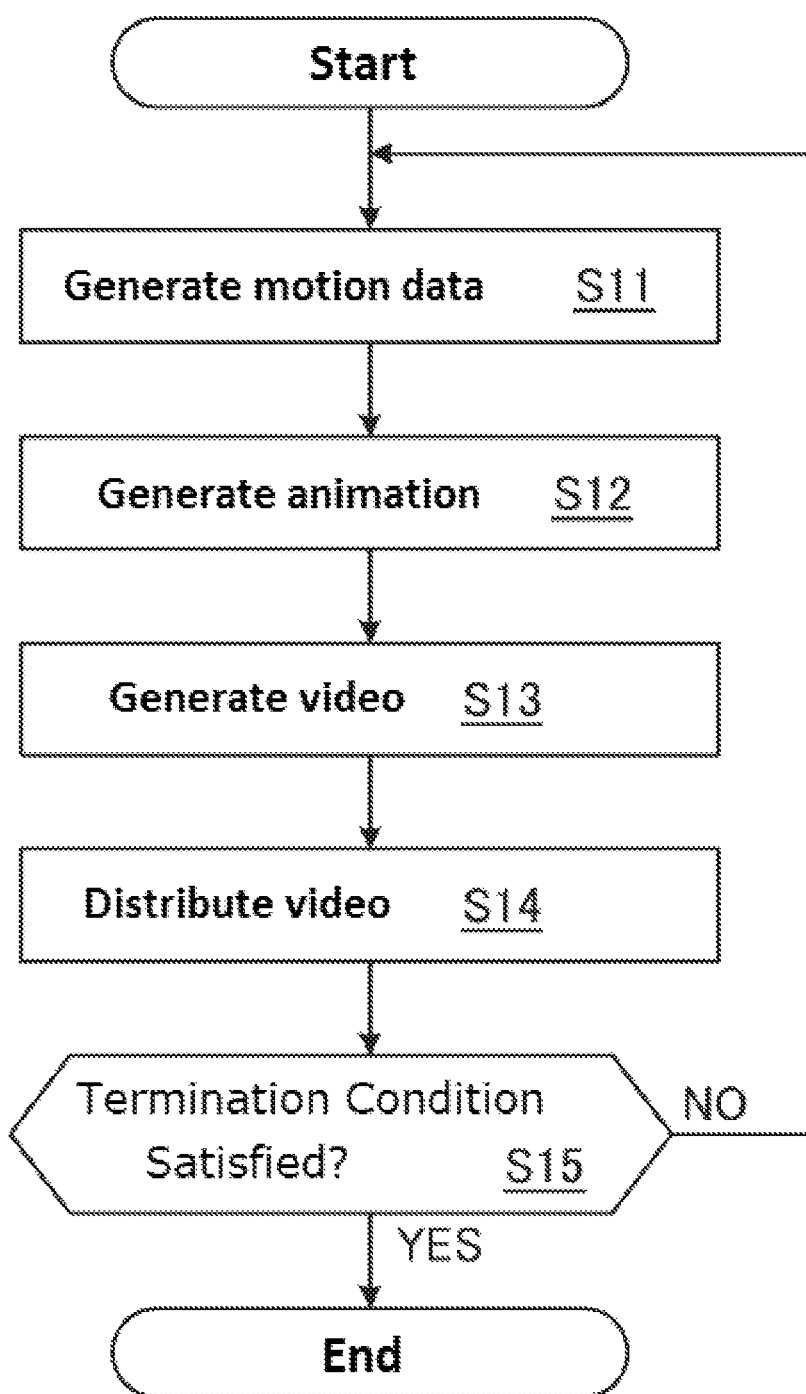
FIG. 9 is a flow chart showing a flow of a video distribution process in one embodiment.
Figure 10:
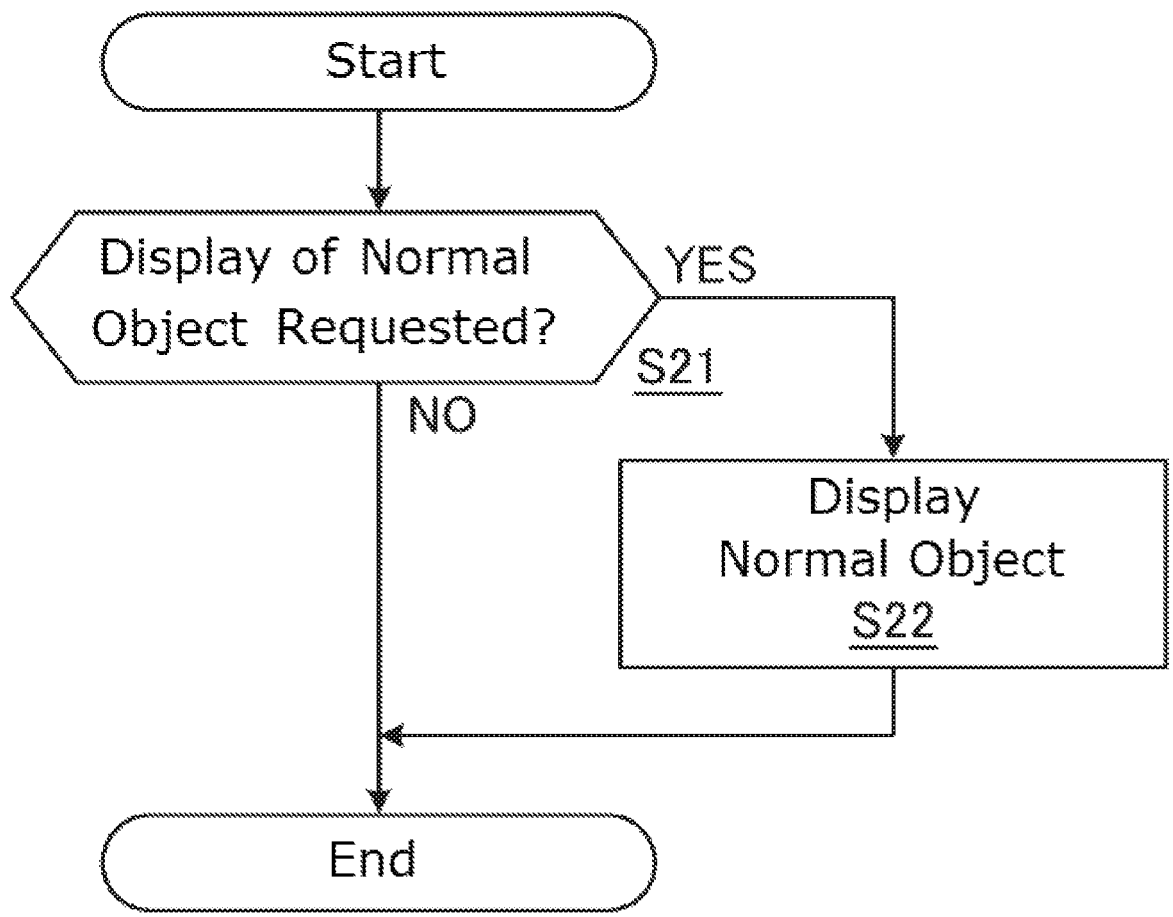
FIG. 10 is a flowchart of a process for displaying a normal object according to an embodiment.
Figure 11:
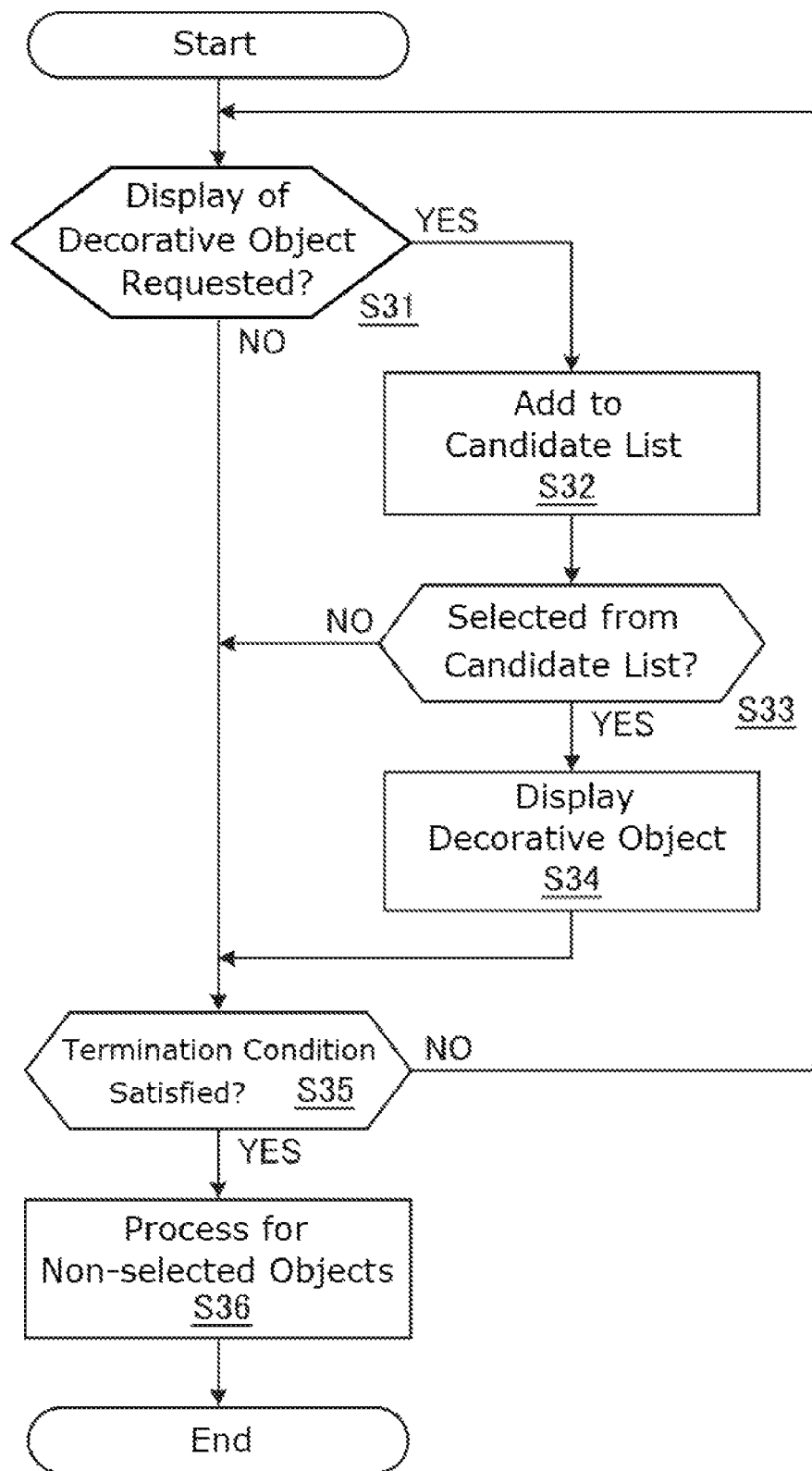
FIG. 11 is a flowchart of a process for displaying a decorative object according to an embodiment.

Next, with reference to FIGS. 9 to 11, a video distribution process in one embodiment will be described. FIG. 9 is a flow chart showing a flow of a video distribution process in one embodiment, FIG. 10 is a flowchart of a process for displaying a normal object according to one embodiment, and FIG. 11 is a flowchart of a process for displaying a decorative object according to one embodiment. In the video distribution process, it is assumed that the actor A1 and the actor A2 are giving performances in the studio room R.

First, in step S11, body motion data, which is a digital representation of the body motions of the actor A1 and the actor A2, and face motion data, which is a digital representation of the facial motions (expression) of the actor A1 and the actor A2, are generated Generation of the body motion data is performed, for example, by the body motion data generation unit 21a described above, and generation of the face motion data is performed, for example, by the face motion data generation unit 21b described above.

Next, in step S12, the body motion data and the face motion data of the actor A1 are applied to the model data for the actor A1 to generate animation of the first character object that moves in synchronization with the motions of the body and facial expression of the actor A1. Similarly, the body motion data and the face motion data of the actor A2 are applied to the model data for the actor A2 to generate animation of the second character object that moves in synchronization with the motions of the body and facial expression of the actor A2. The generation of the animation is performed, for example, by the above-described animation generation unit 21c.

Next, in step S13, a video including the animation of the first character object corresponding to the actor A1 and the animation of the second character object corresponding to the actor A2 is generated. The voices of the actor A1 and the actor A2 may be included in the video. The animation of the first character object and the animation of the second character object may be provided in the virtual space. Generation of the video is performed, for example, by the above-described video generation unit 21d.

Next, the process proceeds to step S14 where the video generated in step S13 is distributed. The video is distributed to the client devices 10a to 10c and other client devices over the network 50. The video may be distributed to the supporter computer 40 and/or may be projected on the screen S in the studio room R. The video is distributed continuously over a predetermined distribution period. The distribution period of the video may be set to, for example, 30 seconds, 1 minute, 5 minutes, 10 minutes, 30 minutes, 60 minutes, 120 minutes, and any other length of time.

Subsequently in step S15, it is determined whether a termination condition for ending the distribution of the video is satisfied. The termination condition is, for example, that the distribution ending time has come, that the supporter computer 40 has issued an instruction to end the distribution, or any other conditions. If the termination condition is not satisfied, the steps S11 to S14 of the process are repeatedly executed, and distribution of the video including the animation synchronized with the movements of the actor A1 and the actor A2 is continued. When it is determined that the termination condition is satisfied for the video, the distribution process of the video is ended.

Next, with further reference to FIG. 10, a description is given of the display process of the normal object that is performed while a video is distributed. The display process of the normal object is performed in parallel with the distribution process of the video shown in FIG. 9.

In step S21, it is determined whether a display request for a normal object has been made while a video is distributed. For example, the first viewing user may select one or more specific normal objects from his/her own normal objects and send a display request to display the selected normal objects from the client device 10a to the server device 20. As described above, a display request for a normal object may be generated in response to the purchase process or the payment process performed for the normal object. Step 21 may be performed by the display request processing unit 21f described above.

When a display request for the normal object has been made, the display process proceeds to step S22. Step S22 is a process for displaying in the video being distributed the normal object for which the display request is made, based on the display request. For example, when a display request for the normal object 74 is made while a video is distributed, the normal object 74 for which the display request is made is displayed in the display screen 70 of the video, as shown in FIG. 6.

When no display request is made for a normal object, the display request for the normal object is ended. The display process of the normal object shown in FIG. 10 is performed repeatedly in the distribution period of the video.

The display process of the effect object is performed by the same procedure as described above for the normal object. For example, when a display request for the effect object 73 is made while a video is distributed, the effect object 73 for which the display request is made is displayed in the display screen 70 of the video, as shown in FIG. 6. The effect object 73 shown in FIG. 6 simulates confetti. The effect object 73 that simulates confetti may be displayed so as to overlap (or contact) with the character object 71A and the character object 71B, but it is different from the decorative object in that it is not displayed in association with a specific portion of the character object 71A and the character object 71B.

Next, with further reference to FIG. 11, a description is given of the display process of the decorative object that is performed while a video is distributed. The display process of the decorative object is performed in parallel with the distribution process of the video shown in FIG. 9. It is also possible that the display process of the decorative object is performed in parallel with the display process of the normal object shown in FIG. 10.

In step S31, it is determined whether a display request for a decorative object has been made while a video is distributed. For example, the first viewing user may select a first decorative object from his/her own decorative objects and send a display request to display the selected first decorative object from the client device 10a to the server device 20. Step 31 may be performed by the display request processing unit 21f described above.

When a display request for the first decorative object has been made, the display process proceeds to step S32. In step S32, the first decorative object for which the display request has been made is added to the candidate list based on the display request. The candidate list is a list of candidate objects for a decorative object to be displayed in the video being distributed, and one example of the candidate list is the candidate list 23d described above.

Next, in step S33, it is determined whether a specific decorative object has been selected from the decorate objects included in the candidate list.

When a specific decorative object has been selected, the display process proceeds to step S34, where the specific decorative object that has been selected ("the selected decorative object") is removed from the candidate list and the selected decorative object is displayed in the display screen of the video being distributed. For example, when the decorative object 75 is selected from the candidate list while the video 70 shown in FIG. 5 is distributed, the decorative object 75 that has been selected is displayed in the display image 70, as shown in FIG. 7. If the first decorative object for which the display request was made in S31 is selected from the candidate list while the video is distributed, the first decorative object is displayed in the display screen 70, and if not selected, it is not displayed in the display image 70.

When no decorative object is selected from the candidate list in step S33 or the display process of the selected decorative object is completed in step S34, the display process of the decorative object proceeds to step S35. In step S35, it is determined whether the distribution of the video being distributed is completed. The determination made in step S35 may be based on the same criterion as in step S15, for example. When it is determined in step S35 that the distribution is not completed, the display process of the decorative object returns to step S31 and then repeats steps S31 to S35. When it is determined that the distribution is completed, the display process of the decorative object proceeds to step S36.

The process performed in step S36 is related to the decorative objects that remain in the candidate list when the distribution of the video is completed (these decorative objects may be herein referred to as "non-selected objects"). The process performed in step S36 may be herein referred to as the non-selected object process.

A non-selected object is an object which was purchased by a viewing user and for which a display request was made while a video is distributed. Therefore, the non-selected object process performed in step S36 may be a process to refund the expense for purchasing the non-selected object to the viewing user who made the display request for the non-selected object. In another embodiment, the non-selected object process may be a process to cancel the payment process for purchasing the non-selected object. In another embodiment, the non-selected object process may be a process to provide the viewing user who made the display request for the non-selected object with a decorative object that is different from the non-selected decorative object.

In another embodiment, the non-selected object process may be a process to provide the user who purchased the non-selected object with points that can be used in the video distribution system 1, instead of refunding the purchase expense or canceling the payment process. The video distribution system 1 may be configured such that users consume points to view videos. The points provided to the user who possesses the non-selected object in the non-selected object process may be usable for viewing videos in the video distribution system 1.

In another embodiment, the non-selected object process may be a process to add, to the possession list, the non-selected object as an object possessed by the first viewing user. Thus, the non-selected object can be returned to the first viewing user.

In another embodiment, the non-selected object process may be a process to retain the candidate list as of the end of the video distribution until the next time the same distributor distributes a video. Thus, in the next video distribution, the distributor can reuse the candidate list used in the previous video distribution. The reused candidate list includes the decorative object for which a display request was made in the previous video distribution and which was not actually displayed in the video (that is, the non-selected object). Thus, the next video distribution can be performed using the candidate list including the non-selected object that was not selected in the previous video distribution. The non-selected object may be selected and displayed in a video in the next video distribution.

After the process of step S36 is completed, the display process of the decorative object is ended.

Figure 12:
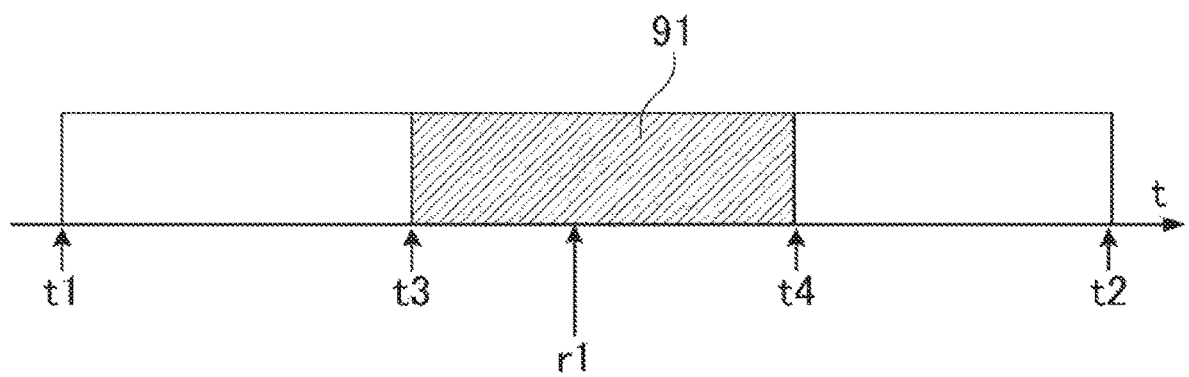
FIG. 12 is a diagram for describing a no-display period set for a video distributed in the video distribution system of FIG. 1.

In one embodiment, there may be provided a no-display period during which display of a gift object in a distributed video is prohibited FIG. 12 is a schematic diagram for describing the no-display period. FIG. 12 shows that a video is distributed between the time t1 and the time t2. In other words, the time t1 is the start time of the video distribution, and the time t2 is the end time of the video distribution. In the time period for the video distribution, the time period between the time t3 and the time t4 is the no-display period 91. When a display request r1 for a gift object is made in the no-display period 91, the gift object is not displayed in the display image of the video during the no-display period 91. More specifically, when a display request for an effect object or a normal object among the gift objects is made in the no-display period 91, the effect object or the normal object for which the display request is made is not displayed in the distributed video during the no-display period 91, and this object is displayed in the video at a time after the end of the no-display period 91 (that is, after the time t4). When a decorative object is selected from the candidate list during the no-display period 91, the selected decorative object is not displayed in the distributed video during the no-display period 91 and is displayed in the video at a time after the end of the no-display period 91. The display request for the decorative object may be received in the no-display period 91. When a display request for the decorative object is made in the no-display period 91, the decorative object for which the display request is made may be added to the candidate list during the no-display period 91.

In the above embodiment, the gift objects include three types of objects: the decorative object, the normal object, and the effect object. Among them, only the decorative object is displayed in association with a character object. In a video containing an animation of a character object, the animation of the character object is an element that attracts viewing users' attention. For example, in the video shown in FIGS. 5 to 7, it is presumed that the character object 71A and the character object 71B attract attention. In the above embodiment, even when a display request is made for a decorative object to be displayed in association with the character object 71A and the character object 71B, the decorative object may be kept from being displayed in the video until the decorative object is selected from the candidate list 23d, so as to prevent that the decorative object is displayed disorderly around or over the character objects. Thus, the viewing experience of the viewing users can be prevented from being deteriorated.

In the conventional video distribution systems, any type of gift object was displayed in a video in response to a display request for the gift object. Therefore, if it is allowed to display gift objects in a video in an overlapping manner, a large amount of gift object may be displayed in the video, resulting in a deteriorated viewing experience of the users viewing the video. In the above embodiment, the gift objects include the category of decorative object to be displayed in association with a character object, making it possible to restrain the number (the amount) of decorative objects displayed in association with a character object that constitutes the main part of a video.

Among the gift objects, the normal object 74 is displayed in a video in response to a display request from a viewing user. In the above embodiment, the normal object 74 is displayed in the display screen 70 of the video so as not to contact or overlap with the character object 71A and the character object 71B, and therefore, the visibility of the character object 71A and the character object 71B is less affected With this arrangement, it is possible to prevent the viewing experience of users from being deteriorated due to reduced visibility of the character objects.

Among the gift objects, the effect object 73 and the normal object 74 are displayed in a video in response to a display request from a viewing user. In the above embodiment, the effect object 73 and the normal object 74 are displayed in the display screen 70 for a smaller duration than the decorative object 75, and therefore, the visibility of the character object 71A and the character object 71B is less affected. With this arrangement, it is possible to prevent the viewing experience of users from being deteriorated due to reduced visibility of the character objects.

In the above embodiment, a decorative object is selected from the candidate list 23d by someone (for example, the supporter B1, the supporter B2, the actor A1, or the Actor A2) other than the viewing user who has made the display request for the decorative object, and therefore, it is possible to restrain the number of displayed decorative objects.

In the above embodiment, a gift object is not displayed in a video during the no-display period 91. Thus, a produced video can be viewed without interruption by the gift object. For example, when the no-display period 91 is set at a time period within the video during which a visual performance is given by the actor A1 and the actor A2, the performance of the actors can be presented to the viewers without interruption by the first object and the decorative object.

In the above embodiment, it is presumed that a viewing user who views a video including character objects such as the character object 71A and the character object 71B is fond of these character objects. Therefore, the viewing user is more satisfied when the character objects wear the decorative object rather than the effect object or the normal object. Thus, the decorative object that can be attached to the character objects induces the user to repeatedly view the video including the character objects.

In the video distribution system 1 according to the above embodiment, a user can present a decorative object to a character. Thus, it is possible to provide a system having higher originality and to provide service having higher originality with the system, as compared to systems in which presenting a decorative object is not allowed. As a result, it is possible to attract may users with the video distribution system 1 and to increase the number of times the users view videos in the video distribution system 1.

Embodiments of the disclosure are not limited to the above embodiments but various modifications are possible within a spirit of the invention. For example, capturing and generating the images of the video to be distributed may be performed in a site other than the studio room R. For example, capturing the images for generating the video to be distributed may be performed at an actor's home or a supporter's home.

The procedures described herein, particularly those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention.

What is claimed is:

1. A video distribution system for distributing a video containing animation of a character object generated based on a motion of an actor, the video distribution system comprising:
   one or more computer processors; and
   a storage for storing a candidate list including candidates of decorative objects to be displayed in the video in association with the character object,
   wherein the one or more computer processors execute computer-readable instructions to:
      in response to reception of a first display request from a viewing user, the first display request being sent while the viewing user is viewing the video for requesting display of a first decorative object among the decorative objects into the video, add the first decorative object to the candidate list, and
      upon selection of the first decorative object from the candidate list by someone other than the viewing user:
         (i) display the first decorative object in the video, and
         (ii) remove the first decorative object from the candidate list.

2. The video distribution system of claim 1, wherein the first decorative object is displayed in the video in association with a specific body part of the character object.

3. The video distribution system of claim 1, wherein the selection of the first decorative object from the candidate list is performed by a supporter who supports distribution of the video.

4. The video distribution system of claim 1, wherein the selection of the first decorative object from the candidate list is performed by the actor.

5. The video distribution system of claim 1, wherein in response to reception of a second display request from the viewing user viewing the video, the second display request being sent as the video is provided to the viewing user for requesting display of a first object that is different from the decorative objects, the one or more computer processors, when executing the computer-readable instructions, cause the first object to be displayed in the video.

6. The video distribution system of claim 5, wherein the first object is displayed in the video so as not to contact with the character object in the video.

7. The video distribution system of claim 5, wherein a no-display period is provided in a distribution period of the video, and the first object and the decorative objects are displayed in the video at a timing in the distribution period of the video other than the no-display period.

8. The video distribution system of claim 7, wherein when the second display request is received in the no-display period, the first object is displayed in the video after an end of the no-display period.

9. The video distribution system of claim 1, wherein the one or more computer processors are configured to:
   receive a purchase request from the viewing user, the purchase request being sent for purchasing the first decorative object,
   perform a payment process in response to the purchase request, and
   cancel the payment process when the first decorative object is not selected before distribution of the video has ended.

10. The video distribution system of claim 1, wherein the one or more computer processors are configured to:
    receive a purchase request from the viewing user, the purchase request being sent for purchasing the first decorative object,
    perform a payment process in response to the purchase request, and
    provide the viewing user with points when the first decorative object is not selected before distribution of the video has ended.

11. The video distribution system of claim 1, wherein the one or more computer processors are configured to:
    receive a purchase request from the viewing user, the purchase request being sent for purchasing the first decorative object,
    add the first decorative object to a possession list in response to the purchase request, the possession list being a list of objects possessed by the viewing user,
    in response to reception of the first display request from the viewing user, add the first decorative object to the candidate list and remove the first decorative object from the possession list, and
    add the first decorative object to the possession list when the first decorative object is not selected before distribution of the video is ended.

12. A video distribution method performed by one or more computer processors executing computer-readable instructions to distribute a video containing animation of a character object generated based on a motion of an actor, the video distribution method comprising:
    storing a candidate list including candidates of decorative objects to be displayed in the video in association with the character object,
    in response to reception of a first display request from a viewing user, the first display request being sent while the viewing user is viewing the video for requesting display of a first decorative object among the decorative objects into the video, adding the first decorative object to the candidate list, and
    upon selection of the first decorative object from the candidate list by someone other than the viewing user:
       (i) causing the first decorative object to be displayed in the video, and
       (ii) removing the first decorative object from the candidate list.

13. A non-transitory computer-readable storage medium storing a video distribution program for distributing a video containing animation of a character object generated based on a motion of an actor, wherein the video distribution program causes one or more computer processors to effectuate operations comprising:
    storing a candidate list including candidates of decorative objects to be displayed in the video in association with the character object,
    in response to reception of a first display request from a viewing user, the first display request being sent while the viewing user is viewing the video for requesting display of a first decorative object among the decorative objects into the video, adding the first decorative object to the candidate list, and upon selection of the first decorative object from the candidate list by someone other than the viewing user:
(i) displaying the first decorative object in the video, and
(ii) removing the first decorative object from the candidate list.

\* \* \* \* \*